United States Patent
Kamada et al.

(10) Patent No.: US 8,602,462 B2
(45) Date of Patent: Dec. 10, 2013

(54) DEVICE LATCH HOOK AND ATTACHMENT DEVICE INCLUDING THE SAME

(75) Inventors: Hiroshi Kamada, Kyoto (JP); Kazuo Yoneyama, Kyoto (JP); Masaki Amano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 581 days.

(21) Appl. No.: 12/222,866

(22) Filed: Aug. 18, 2008

(65) Prior Publication Data

US 2009/0070971 A1    Mar. 19, 2009

(30) Foreign Application Priority Data

Sep. 13, 2007 (JP) .................. 2007-238071

(51) Int. Cl.
*E05C 19/10* (2006.01)

(52) U.S. Cl.
USPC ............ 292/95; 292/DIG. 38; 292/219

(58) Field of Classification Search
USPC ........ 292/95, 121, 1, DIG. 23, 194, 195, 219, 292/220, 128, 228, DIG. 38; 463/47; 24/495, 489; 16/206
See application file for complete search history.

(56) References Cited

U.S. PATENT DOCUMENTS

| | | | |
|---|---|---|---|
| 3,797,870 A * | 3/1974 | Beckman | 70/84 |
| 4,138,151 A * | 2/1979 | Nakao | 292/76 |
| 5,263,346 A * | 11/1993 | Sato et al. | 70/210 |
| 5,472,351 A | 12/1995 | Greco et al. | |
| 6,125,040 A | 9/2000 | Nobuchi et al. | |
| 6,439,956 B1 | 8/2002 | Ho | |
| 6,482,020 B1 | 11/2002 | Yeh | |
| 6,580,615 B1 | 6/2003 | Nakanishi et al. | |
| 7,066,394 B2 | 6/2006 | Kondo et al. | |
| 7,118,394 B2 | 10/2006 | Yoneyama et al. | |
| 7,644,963 B2 * | 1/2010 | Fan et al. | 292/95 |
| 2003/0194897 A1 | 10/2003 | Nishioka | |
| 2004/0009691 A1 | 1/2004 | Chang | |
| 2004/0014342 A1 | 1/2004 | Yu et al. | |

(Continued)

FOREIGN PATENT DOCUMENTS

| | | | |
|---|---|---|---|
| CN | 101083886 | * | 6/2006 |
| EP | 1365562 | | 11/2003 |

(Continued)

OTHER PUBLICATIONS

Advisory Action dated Apr. 13, 2012 in related U.S. Appl. No. 12/222,802 (3 pgs.).

(Continued)

*Primary Examiner* — Kristina Fulton
(74) *Attorney, Agent, or Firm* — Nixon & Vanderhye P.C.

(57) ABSTRACT

A hook 14 causes an attachment device (cartridge), which is mounted into an insertion slot arranged in an electronic apparatus such as a game apparatus, to be engaged with the insertion slot. The hook includes an arm 22, a ring portion 21 and a latch portion 23. The ring portion 21 is connected to one end of the arm 22. The latch portion 23 is connected to the other end of the arm 22, and is latchable onto a predetermined portion of the insertion slot. Further, the ring portion 21 is pivoted by a spindle 31 of the attachment device, and is shaped so as to be deformable when a force from the arm 22 is applied thereto, the force being caused by the attachment device moving so as to be ejected from the insertion slot.

17 Claims, 17 Drawing Sheets

(56) References Cited

U.S. PATENT DOCUMENTS

| | | |
|---|---|---|
| 2005/0202716 A1 | 9/2005 | Saito |
| 2005/0206169 A1 | 9/2005 | Lin et al. |
| 2007/0120372 A1 | 5/2007 | Zhang et al. |
| 2007/0138806 A1 | 6/2007 | Ligtenberg et al. |
| 2007/0141902 A1 | 6/2007 | Barina et al. |
| 2008/0101787 A1 | 5/2008 | Kuo |
| 2008/0218953 A1 | 9/2008 | Yun et al. |
| 2009/0082115 A1* | 3/2009 | Kamada et al. ............ 463/47 |
| 2009/0141437 A1* | 6/2009 | Geiger et al. ......... 361/679.21 |

FOREIGN PATENT DOCUMENTS

| | | |
|---|---|---|
| JP | U-S62-074763 | 5/1987 |
| JP | U-H02-77736 | 6/1990 |
| JP | U-H03-101870 | 10/1991 |
| JP | 06-44413 | 2/1994 |
| JP | 2003-77585 | 3/2003 |
| JP | 2004-87480 | 3/2004 |
| WO | 03/021724 A1 | 3/2003 |

OTHER PUBLICATIONS

Office Action dated Jan. 5, 2012 in related U.S. Appl. No. 12/222,802 (12 pgs.).

Office Action dated Mar. 26, 2012 issued in related Japanese Application No. 2007-238071 (4 pgs.).

Office Action (14 pgs.) dated Jul. 29, 2011 issued in co-pending U.S. Appl. No. 12/222,802.

* cited by examiner

DEVICE LATCH HOOK AND ATTACHMENT DEVICE INCLUDING THE SAME

CROSS REFERENCE TO RELATED APPLICATION

The disclosure of Japanese Patent Application No. 2007-238071, filed Sep. 13, 2007, is incorporated herein by reference.

BACKGROUND OF EXAMPLE EMBODIMENTS OF THE INVENTION

1. Field of Example Embodiments of the Invention

Example embodiments of the present invention relate to a device latch hook, an attachment device and an electronic apparatus system. Example embodiments of the present invention more particularly relate to a device latch hook provided to an attachment device so as to prevent the attachment device which is inserted in an insertion slot of an electronic apparatus from being disengaged from the insertion slot, and the attachment device and an electronic apparatus system which include the device latch hook.

2. Description of the Background Art

Conventionally, a mechanism for mounting an attachment device such as a memory card into an electronic apparatus such as a hand-held device has been developed. For example, in Patent document 1 (Japanese Laid-Open Patent Publication No. 06-44413), a mechanism for mounting an IC card into a card loading device is disclosed. Patent document 1 discloses a hook to latch the IC card so as to be kept inserted therein.

In the case of the conventional hook, when a strong impact is applied to the electronic apparatus and the attachment device, a strong force is applied to the hook, and as a result, the hook is likely to be broken. Particularly in the case of a hand-held device, since the device needs to be downsized, it is difficult to increase a size of the hook in order to improve strength of the hook. On the other hand, since the hand-held device is portable, it is highly likely that the hand-held device is subject to a strong impact. For example, a user drops the hand-held device, or the hand-held device is bumped against some material. Therefore, particularly for the hand-held device, there has been desired a hook which is not broken even when a strong impact is applied to the hand-held device.

SUMMARY OF EXAMPLE EMBODIMENTS OF THE INVENTION

Therefore, one aspect of example embodiments of the present invention is to provide a highly impact-resistant hook and an attachment device including the same.

The example embodiments of the present invention have the following configurations to attain the aspects described above. The reference numerals, supplementary explanations and the like in the parentheses indicate the correspondence with the embodiment described below in order to aid in understanding the example embodiments of the present invention and are not intended to limit, in any way, the scope of the example embodiments of the present invention.

When an electronic apparatus and an attachment device, which are engaged with each other, are subject to an impact, the attachment device is likely to be moved to be ejected from an insertion slot, and due to such movement, a strong force is applied to the hook which is in a latched state. The example embodiments of the present invention described below focus this point.

A first aspect is directed to a hook (14) which is provided to an attachment device (cartridge 1) so as to prevent the attachment device mounted into an insertion slot (8) of an electronic apparatus (game apparatus 5) from being dismounted from the insertion slot. The hook includes: a ring portion (21), a latch portion (23), and an arm (22). The ring portion is formed at one end of the hook, and is pivoted by a spindle (31) situated in the attachment device. The latch portion is formed at the other end of the hook, and is caused, by the ring portion rotating around the spindle, to be switched between a latched state, in which the hook is latched onto a predetermined portion of the electronic apparatus, and a non-latched state. The arm connects between the ring portion and the latch portion. The ring portion is shaped so as to be deformable when a force is applied from the arm thereto, the force being caused by the attachment device moving so as to be ejected from the insertion slot in the latched state.

In a second aspect, the ring portion may be shaped so as to include a slit (27) which intersects the ring portion from an inner circumference thereof to an outer circumference thereof.

In a third aspect, the slit may be situated at a side opposite to a portion connecting between the ring portion and the arm.

In a fourth aspect, the ring portion may have two forearm portions (21a, 21b) which grasp the spindle.

In a fifth aspect, the ring portion may be configured such that the two forearm portions are partially overlapped with each other (FIG. 16).

In a sixth aspect, the two forearm portions of the ring portion may grasp the spindle such that an air gap (A2) having a width smaller than a diameter of the spindle is formed between the spindle and the two forearm portions at a side opposite to a portion connecting between the ring portion and the arm (FIG. 17).

A seventh aspect is directed to an attachment device mountable into an insertion slot arranged in an electronic apparatus. The attachment device includes: the hook based on the first to sixth aspects, a housing (11), an elastic material (spring 32), and a button (13). The housing has a hook hole (17) situated at a portion to be inserted into the insertion slot, and has a spindle formed thereinside so as to pivot the ring portion. The elastic material is provided inside the housing, and biases the hook such that the latch portion of the hook is exposed outward from the hook hole of the housing. The button is controllable outside the housing, and causes the elastic material to be deformed elastically such that the latch portion is housed inside the housing.

In an eighth aspect, a movement limiting portion (partition wall 34) may be provided in the housing. The movement limiting portion may limit the moving range of the hook so as not to cause the ring portion to be disengaged from the spindle when a force is applied to the ring portion, the force being caused by the attachment device moving so as to be ejected from the insertion slot.

In a ninth aspect, when the hook collides against the movement limiting portion, the movement limiting portion may cause the latch portion to move so as to be housed inside the housing.

A tenth aspect is directed to an electronic apparatus system including the attachment device based on the seventh to ninth aspects, and an electronic apparatus. The electronic apparatus has an insertion slot for receiving the attachment device mounted thereinto, and also has a portion latched onto by the hook, the portion being formed on a wall surface inside the insertion slot.

An eleventh aspect is directed to a hook (14) for causing an attachment device (cartridge 1), which is mounted into an insertion slot (8) arranged in an electronic apparatus (game apparatus 5), to be latched onto the insertion slot. The hook includes a ring portion (21), a latch portion (23), and an arm (22). The ring portion is formed at one end of the hook, and is of a ring shape. The latch portion is formed at the other end of the hook, and is latchable onto a predetermined portion of the electronic apparatus. The arm connects between the ring portion and the latch portion. The ring portion is shaped so as to be deformable when a tensile force from the arm is applied thereto under a state where the ring portion is pivoted by a spindle (31) of the attachment device.

A twelfth aspect is directed to a hook which has a ring portion (21) of a ring shape formed at one end thereof, and which has a latch portion (23), which is latchable onto a predetermined portion, formed at the other end thereof. The ring portion is shaped so as to be deformable when a tensile force from the arm (22), which connects between the ring portion and the latch portion, is applied thereto under a state where the ring portion is pivoted by a predetermined spindle (31).

According to the first aspect, the eleventh and the twelfth aspects, when an impact is applied to the electronic apparatus and the attachment device which are engaged with each other, and consequently a strong force is applied to the hook, the ring portion is deformed, and the hook is moved. Accordingly, it is possible to reduce the force applied to the hook, and thus it is possible to prevent the hook from being broken. Also, it is possible to provide a highly impact-resistant hook.

According to the second aspect, with a simple configuration in which the slit is provided to the ring portion, it is possible to realize a highly impact-resistant hook.

According to the third aspect, compared to a case where the slit is provided at a side where the ring portion and the arm are connected to each other, it is possible to reduce a possibility of the ring portion being broken.

According to the fourth to sixth aspects, the two forearm portions of the ring portion grasp the spindle. Accordingly, when a tensile force from the arm is applied to the ring portion while the ring portion is pivoted by the spindle, the two forearm portions are deformed so as to open out. Therefore, it is possible to prevent the ring portion from being broken.

According to the seventh aspect, with the attachment device having a hook which is the same as that of the first aspect, it is possible to firmly fix the attachment device to the electronic apparatus, and also possible to improve the impact-resistance of the hook. Further, according to the seventh aspect, with an operation of the button, it is possible to disengage the hook, which is latched onto the predetermined position in the insertion slot. Therefore, it is possible to easily eject the attachment device from the insertion slot.

According to the eighth aspect, in the case where a strong force is applied to the hook and consequently the hook is moved, it is possible to prevent the ring portion from being disengaged from the spindle.

According to the ninth aspect, in the case where a strong force is applied to the hook, and consequently the hook is moved to abut against the movement limiting portion, it is possible to release the hook from the latched state. Accordingly, in the case where the strong force is applied to the hook, the hook is automatically unlatched, and thus it is possible to securely prevent the hook from being broken.

According to tenth aspect, in the same manner as the seventh aspect, it is possible to firmly fix the attachment device to the electronic apparatus, and also possible to improve the impact-resistance of the hook.

These and other features, aspects and advantages of the example embodiments of the present invention will become more apparent from the following detailed description of the example embodiments of the present invention when taken in conjunction with the accompanying drawings.

DESCRIPTION OF THE PREFERRED EXAMPLE EMBODIMENTS

Hereinafter, a device latch hook and an attachment device according to one embodiment of the present invention will be described. In the present embodiment, a case will be described where an electronic apparatus into which the attachment device is mounted is a hand-held game apparatus, and the attachment device is a cartridge capable of receiving digital broadcasting. The present invention is also applicable to other apparatuses and devices than the above-described game apparatus and cartridge. For example, the electronic apparatus into which the attachment device is mounted may be replaced with a portable terminal such as a portable phone and a PDA. Further, the attachment device may be a storage medium (such as a memory card) having a predetermined application (program) stored thereon, or may be a storage medium for storing data generated in the electronic apparatus. Still alternatively, the attachment device may be a cartridge for causing the electronic apparatus to expand its capabilities in addition to the capability of receiving the digital broadcasting.

(General Description of Game Apparatus and Cartridge)

Figure 1:
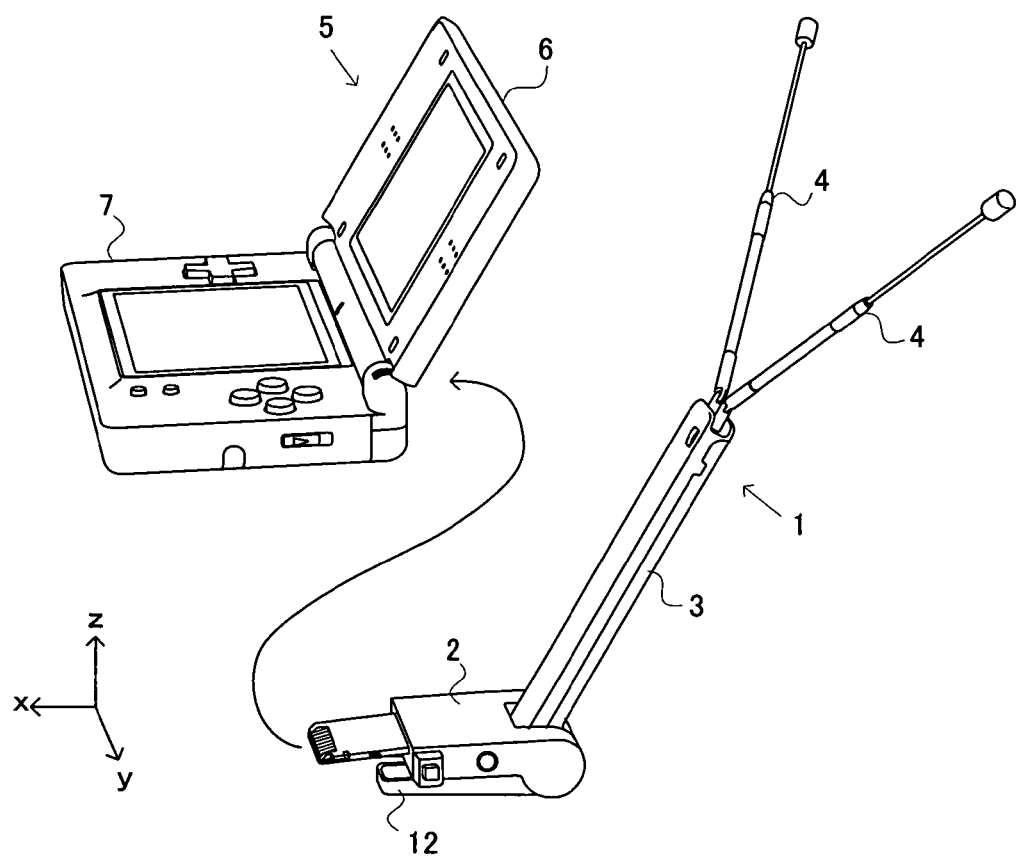
FIG. 1 is a diagram showing an outer appearance of a game apparatus and a cartridge.
Figure 2:
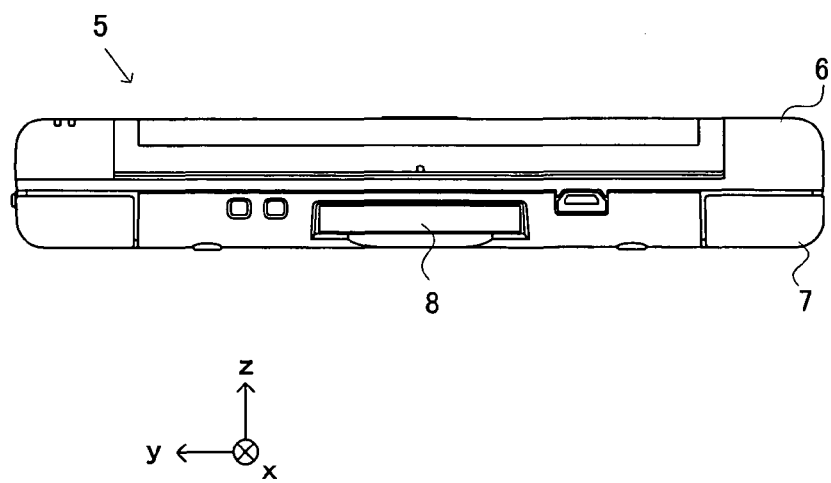
FIG. 2 is a plan view showing an end surface of a game apparatus 5, where an insertion slot is arranged.
Figure 3:
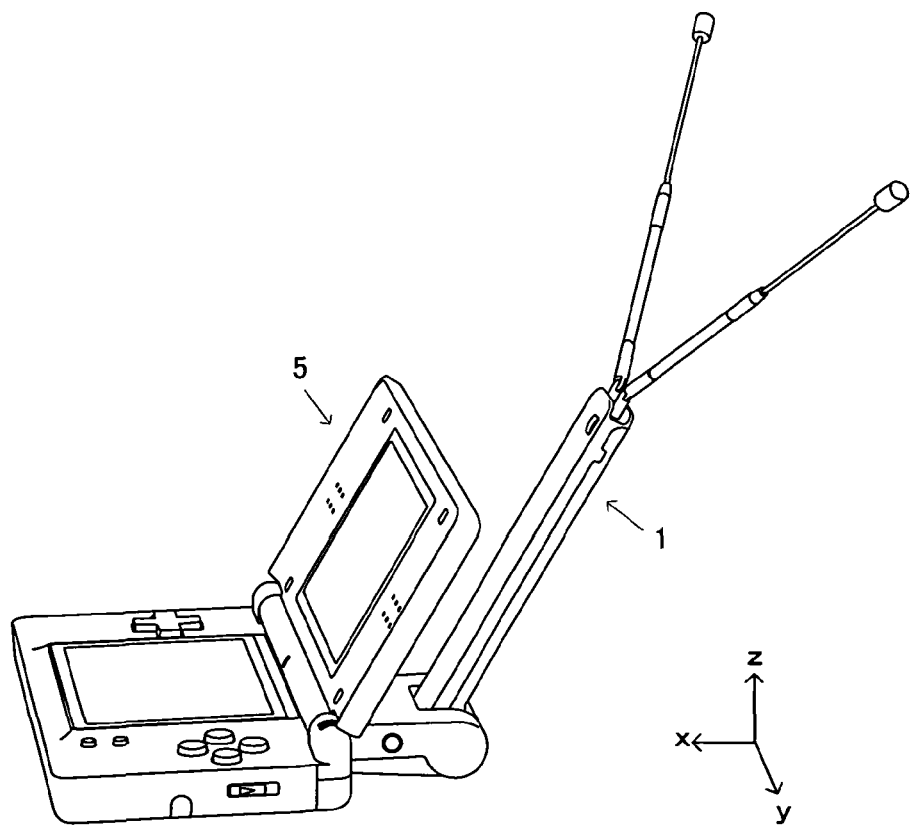
FIG. 3 is a diagram showing the game apparatus having the cartridge mounted therein.

With reference to FIGS. 1 to 3, a general configuration of the game apparatus and the cartridge will be described, respectively. FIG. 1 is a diagram showing an outer appearance of each of the game apparatus and the cartridge. The game apparatus 5 shown in FIG. 1 includes display devices (two display devices in FIG. 1), buttons and the like. A predetermined game program is executed thereon, whereby a player (user) is able to play a game. In the present embodiment, the game apparatus 5 is a fold-type hand-held game apparatus, and has two housings, that is, an upper housing 6 and a lower housing 7. Each of the housings 6 and 7 is of a rectangular planar shape. One side of the housing 6 is connected to one side of the housing 7 such that both of the housings 6 and 7 are rotatable about the connected one sides. FIG. 2 is a plan view showing an end surface of the game apparatus 5, where an insertion slot is arranged. FIG. 2 shows the game apparatus 5 in a state where the two housings 6 and 7 are folded together, and shows the end surface on which the housings 6 and 7 are connected to each other. As shown in FIG. 2, on the end surface of the game apparatus 5, the insertion slot 8 is arranged so as to mount therein the attachment device such as the cartridge 1. The insertion slot 8 may be arranged at any position. Further, the insertion slot 8 may have mounted therein any other types of attachment devices as well as the cartridge 1.

The cartridge 1 shown in FIG. 1 is the attachment device to be mounted into the game apparatus 5. The cartridge 1 has a main body part 2 insertable into the insertion slot 8 of the game apparatus 5. The main body part 2 has a housing (a housing 11 shown in FIG. 4), and further has a predetermined circuit board for processing a digital broadcast signal, the circuit board being situated inside the housing. Although details will be described later, the main body part 2 of the cartridge 1 is detachably inserted into the insertion slot 8. FIG. 3 is a diagram showing a game apparatus having the cartridge inserted therein. When the user is to view digital broadcasting by using the game apparatus 5, the user inserts the cartridge 1 into the game apparatus 5, as shown in FIG. 3. The cartridge 1 is inserted into the insertion slot 8, whereby it is possible to cause the game apparatus 5 to receive the digital broadcasting.

The cartridge 1 includes an antenna housing part 3 and an antenna 4. To one edge of the main body part 2, one end of the antenna housing part 3 is rotatably connected. The antenna housing part 3 is configured with a tubular material and has a hollow inside thereof so as to accommodate the antenna 4. The antenna 4 is connected to the other end of the antenna housing part 3. The antenna 4 receives digital broadcasting, and in the present embodiment, the cartridge 1 has two antennas 4. Each of the antennas 4 can be moved at any angle relative to the antenna housing part 3. Further, a connection part between the antenna housing part 3 and the antenna 4 is slidable along the hollow inside the tubular antenna housing part 3. Therefore, the antenna housing part 3 is capable of accommodating each of the antennas 4 thereinside. Each of the antennas 4 is housed inside the antenna housing part 3, and the main body part 2 and the antenna housing part 3 are folded up by rotating the antenna housing part 3, whereby the antenna cartridge 1 is downsized when the same is not used.

(Configuration of Main Body Part 2 of Cartridge 1)

Figure 4:
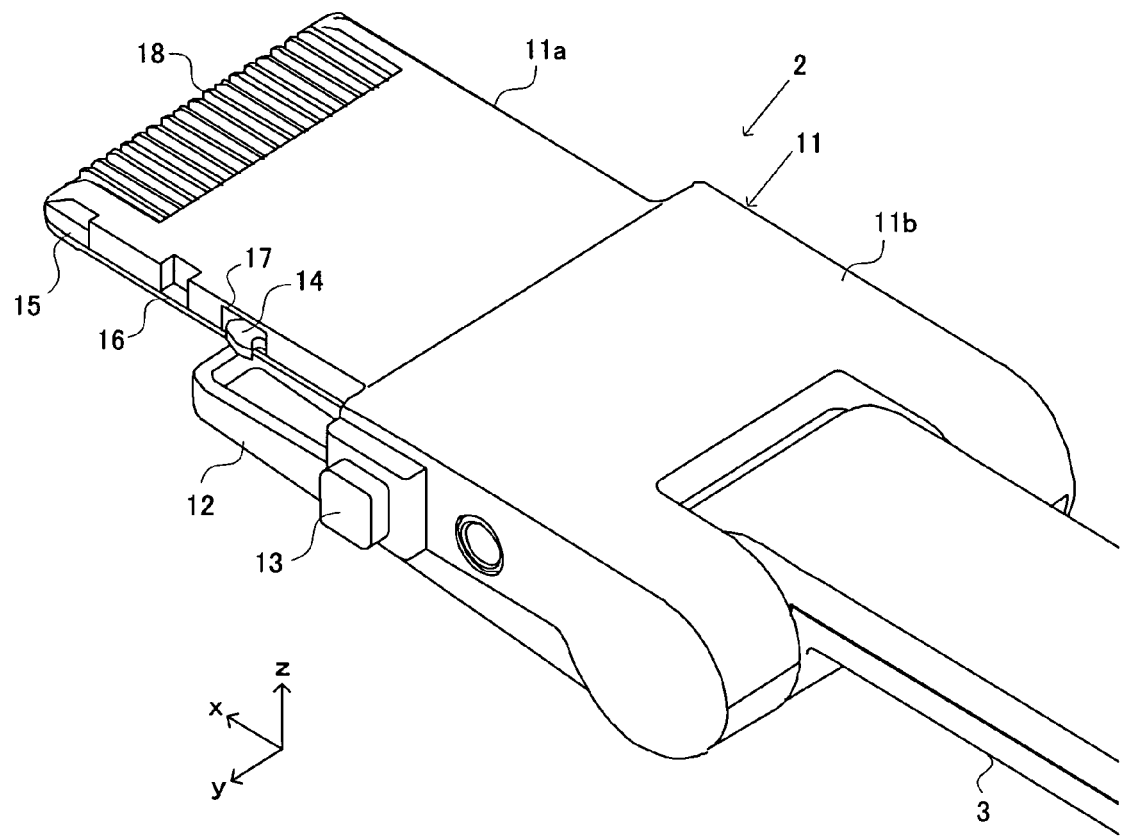
FIG. 4 is a diagram showing, in detail, a configuration of a main body 2 of a cartridge 1.

With reference to FIGS. 4 to 7, a configuration of the main body part 2 of the cartridge 1 will be described. FIG. 4 is a diagram showing, in detail, a configuration of the main body part 2 of the cartridge 1. The main body part 2 has a housing 11 and a protruding part 12. A rear edge (an edge at an x-axis negative side shown in FIG. 4) of the housing 11 is rotatably connected to the antenna housing part 3, thereby supporting the antenna housing part 3. Hereinafter, for the sake of description of the main body part 2, a side thereof (the x-axis negative side shown in FIG. 4) which is connected to the antenna housing part 3 is referred to as a rear side, and a side opposite thereto (an x-axis positive side shown in FIG. 4) is referred to as a front side.

The housing 11 has an insertion section 11a and a non-insertion section 11b. The insertion section 11a of the housing 11 is a part inserted into the insertion slot of the game apparatus 5. The insertion section 11a is of a planar shape having an upper surface (a surface at a z-axis positive side shown in FIG. 4) and a lower surface, and is slightly smaller in size than the insertion slot 8 of the game apparatus 5. When the cartridge 1 is inserted into the game apparatus 5, the insertion section 11a is inserted inside the insertion slot 8. The insertion section 11a has a plurality of connection terminals 18 for causing the cartridge 1 and the game apparatus 5 to be electrically connected to each other. The connection terminals 18 are provided at a front edge on the upper surface of the insertion section 11a. The non-insertion section 11b represents a part of the housing 11 other than the insertion section 11a.

The cartridge 1 has a device latch hook (hereinafter, simply referred to as a hook) 14 according to the present embodiment. The hook 14 is a member for latching the insertion section 11a, which is inserted into the insertion slot 8, on the game apparatus 5. The hook 14 is housed inside the housing 11, and an end thereof is connected to a spindle situated inside the housing 11. Although details will be described later, the hook 14 is rotatably connected to the housing 11. A hook hole 17 is provided on one side surface (a side surface at a y-axis positive side shown in FIG. 4) of the insertion section 11a. In FIG. 4, a latch portion at a tip end of the hook 14 (a latch portion 23 shown in FIG. 5) protrudes outward from the hook hole 17 of the insertion section 11a. Further, a button 13 is provided to the one side surface of the housing 11, the one side surface also having the hook hole 17 provided thereon. The button 13 is fixed at a position such that the button 13 stays outside the insertion slot 8 when the non-insertion section 11b, i.e., the cartridge 1, is mounted into the insertion slot 8. The button 13 causes the hook 14 to rotate such that the hook 14 is released from a latched state (more specifically, such that the latch portion of the hook 14 is housed inside the insertion section 11a). Hereinafter, with reference to FIGS. 5 and 6, a configuration of the hook 14 will be described.

Figure 5:
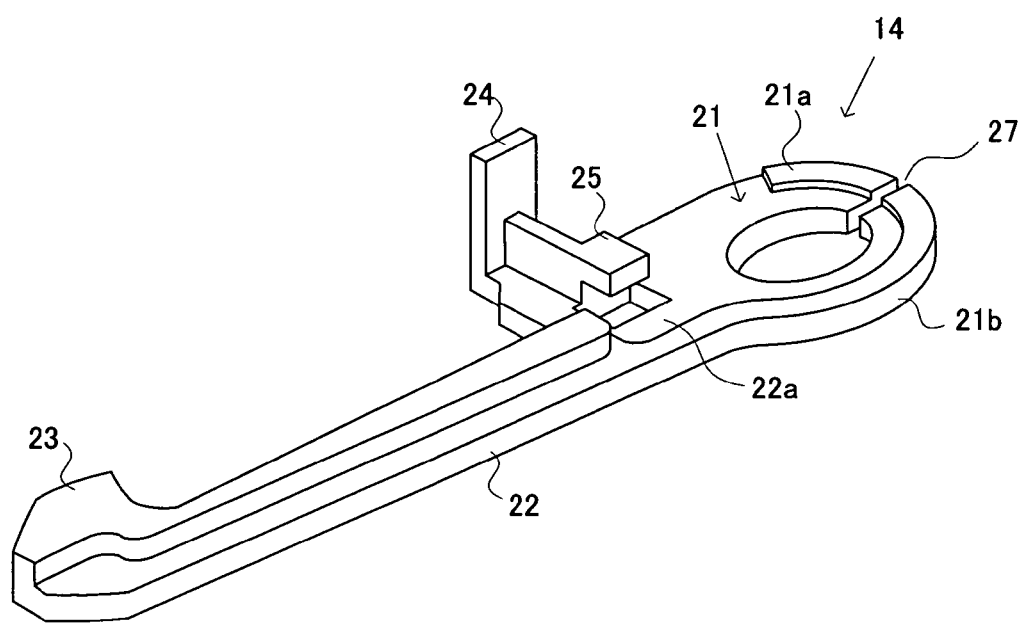
FIG. 5 is a perspective view of a hook 14.

FIG. 5 is a perspective view of the hook 14. As shown in FIG. 5, the hook 14 includes a ring portion 21, an arm 22, the latch portion 23, a pressing portion 24, and a protruding portion 25. In the present embodiment, each of the portions 21 to 25 included in the hook 14 are molded and configured in an integrated manner. As shown in FIG. 5, the ring portion 21 is formed at one end of the hook 14, and the latch portion 23 is formed the other end thereof. The ring portion 21 and the latch portion 23 are connected to each other with the arm 22. Further, the hook 14 is made from an elastic material (for example, a stiff resin), and may be alternatively made from a PA, an ABS, a PC, a POM, a PP and the like. Preferably, the hook may be made from nylon containing glass fiber. In the present embodiment, the hook 14 is made from nylon 6 containing the glass fiber.

As shown in FIG. 5, the ring portion 21 is formed at the one end of the hook 14. The ring portion 21 is designed to cause the hook 14 to be rotatably connected to the housing 11. The ring portion 21 has two forearm portions 21a and 21b which are respectively extending from a connecting portion 22a (an end of the arm 22 on the ring portion 21 side) which connects between the arm 22 and the forearm portions. The two forearm portions 21a and 21b of the ring portion 21 grasp the spindle, which is to be described later, whereby the ring portion 21 is rotatably connected to the spindle. In the present embodiment, each of the forearm portions 21a and 21b are configured such that an interval (a slit 27), which is smaller than a diameter of the spindle, is formed between a tip end of the forearm portion 21a and a tip end of the forearm portion 21b. In other words, in the present embodiment, the ring portion 21 is shaped such that a cut, which intersects the ring portion from its inner circumference to its outer circumference, is formed. In FIG. 5, the cut corresponds to the slit 27 which has a predetermined interval. However, in another embodiment, the cut (slit) does not necessarily have the interval. The slit 27 is formed at a side opposite to the connecting potion 22a between the ring portion 21 and the arm 22. As shown in FIG. 5, in order to enhance the strength of the ring portion 21, and also in order to secure a space for locating a spring 32, which is to be described later, on the inner circumference side, the ring portion 21 is configured such that an outer circumference portion of the forearm portions of the ring portion 21 is thicker than an inner circumference portion thereof, the tip ends of the forearm portions being situated so as to sandwich the slit 27.

At the other end of the hook 14, the latch portion 23 of a hook shape is formed. The latch portion 23 is designed to cause the cartridge 1 to latch onto a predetermined portion in the insertion slot 8 of the game apparatus 5, when the cartridge 1 is inserted into the game apparatus 5. As shown in FIG. 5, in order to make the latch portion 23 stronger than the ring portion 21, the latch portion 23 is made thicker than the ring portion 21. A part of the arm 22 is configured so as to be as thick as the latch portion 23, and the remaining portion is configured to be thinner than the part of the arm 22. Such configuration is designed to prevent the arm 22 from interfering with other component parts when the arm 22 moves, and also designed to maintain the strength of the part of the arm 22, the portion not interfering with the other component parts.

The pressing portion 24 and the protruding portion 25 are provided to the connecting portion 22a between the ring portion 21 and the arm 22. The pressing portion 24 is situated so as to abut against the button 13 when the hook 14 is connected to the housing 11. The protruding portion 25 is provided so as to latch a spring (the spring 32 shown in FIG. 6) thereonto, the spring being described later.

Figure 6:
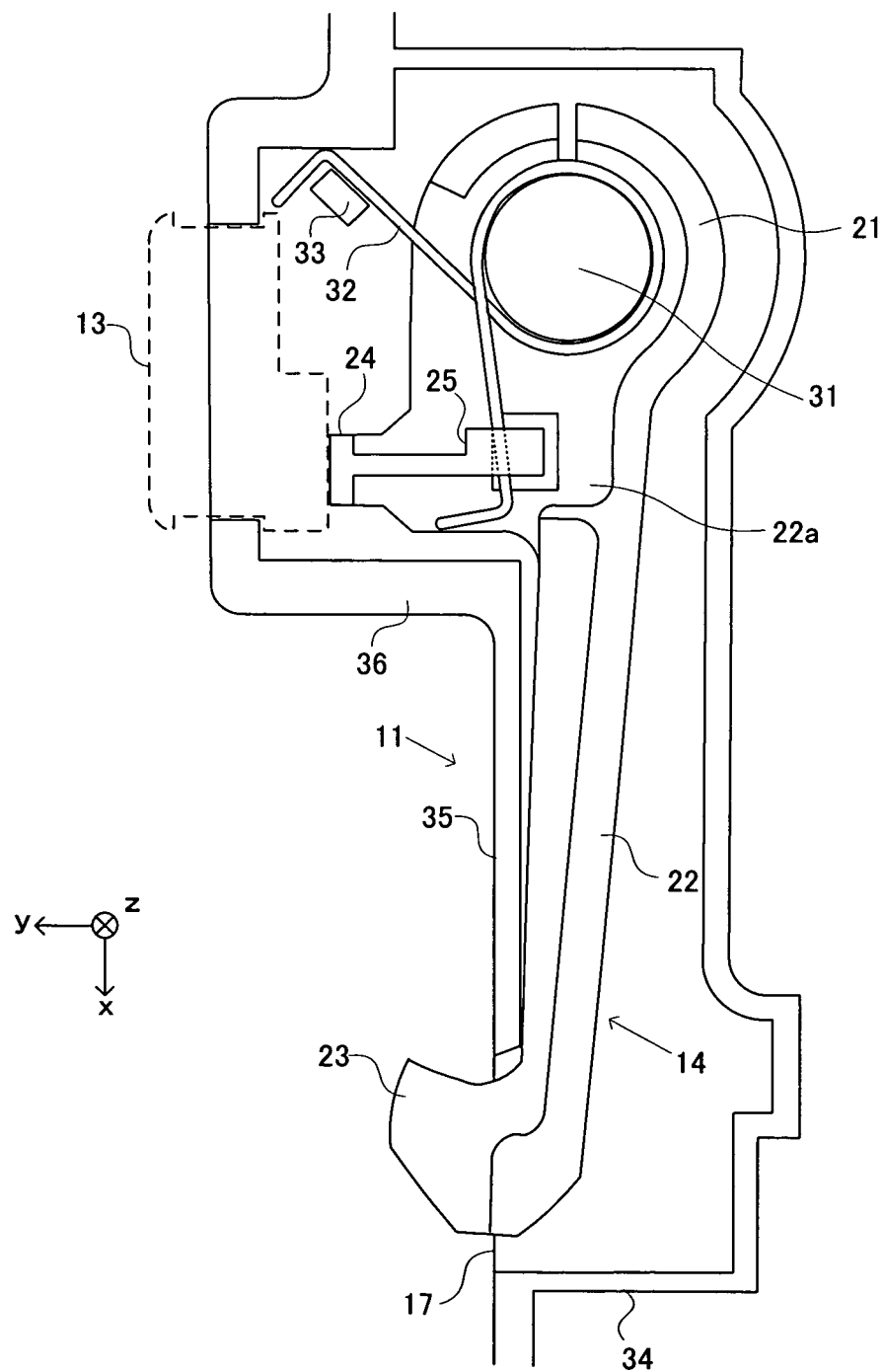
FIG. 6 is a diagram showing an internal configuration of a part of a housing 11, the portion to which the hook 14 is provided.

FIG. 6 is a diagram showing an internal configuration of a part of the housing 11, the portion to which the hook 14 is provided. As shown in FIG. 6, the housing 11 includes thereinside a spindle 31, the spring 32, the protruding portion 33, and a partition wall 34. The spindle 31 is formed at a predetermined position inside the housing 11 (for example, being molded integrally with the housing 11), and is of a cylindrical shape. The hook 14 is rotatably pivoted by the spindle 31. That is, the hook 14 is connected to the spindle 31 such that the spindle 31 is engaged with a hole of the ring portion 21. Further, the spindle 31 pivots the hook 14 such that the pressing portion 24 of the hook 14 abuts against the button 13, and such that the latch portion 23 of the hook 14 is protrusible outward from the hook hole 17 of insertion section 11a.

The spring 32 is a torsion coil spring, and has a ring portion situated at a central portion thereof. The diameter of the ring portion is substantially the same as that of the spindle 31. The ring portion of the spring 32 is fitted around the spindle 31. One end of the spring 32 abuts against the protruding portion 33 formed inside the housing 11, and the other end of the spring is fixed so as to abut against the protruding portion 25 of the hook 14 (see FIG. 6). As shown in FIG. 6, the spring 32 biases the hook 14 such that the latch portion 23 of the hook 14, which is pivoted by the spindle 31, protrudes outward from the hook hole 17 of the insertion section 11a. Therefore, under a state where the hook 14 and the spring 32 are fixed to the housing 11, the hook 14 is maintained in a state where the arm 22 thereof abuts against an outside wall 35 of the housing 11, and the latch portion 23 thereof protrudes outward from the hook hole 17 of the insertion section 11a (see FIG. 6).

Figure 7:
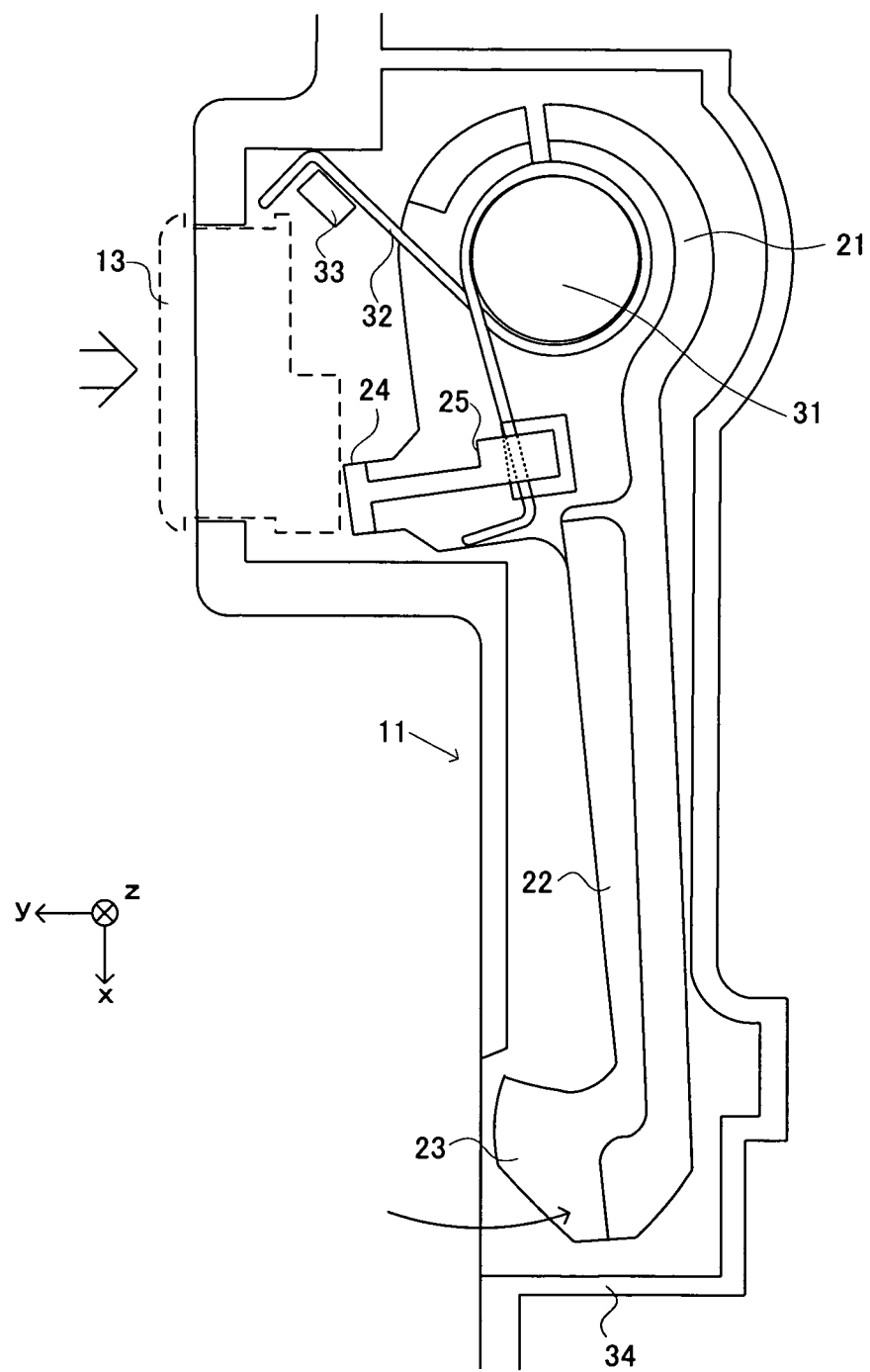
FIG. 7 is a diagram showing a state where a button 13 is pressed from a state shown in FIG. 6.

As above described, under the state where the latch portion 23 of the hook 14 protrudes outward from the hook hole 17 of the insertion section 11a, an underside of the button 13 abuts against the pressing portion 24. Therefore, by pressing the button 13, the pressing portion 24 is pressed, and the hook 14 rotates. FIG. 7 is a diagram showing a state where the button 13 is pressed from a state shown in FIG. 6. As shown in FIG. 7, when the button 13 is pressed, the hook 14 rotates, and the latch portion 23 is housed inside the insertion section 11a. In this case, the spring 32 is elastically deformed. When the button 13 is released from being pressed, a bias force of the spring 32 causes the hook 14 to return to the state where the latch portion 23 protrudes outward from the hook hole 17 of the insertion section 11a.

With reference back to FIG. 6, ahead of the latch portion 23, as viewed from the side of the arm 22, a partition wall 34 is provided. At the x-axis positive side of the connecting portion 22a between the ring portion 21 and the arm 22, an outside wall 36 of the housing 11 is provided. Although details will be described later, when a tensile force to pull the ring portion 21 is applied to the latch portion 23, the ring portion 21 may be deformed (more particularly, the ring portion will be deformed so as to extend in an insertion/ejection direction) since the above-described slit 27 is formed. Therefore, when the tensile force is applied, the ring portion 21 is deformed, and thus the hook 14 slightly moves toward the front side of the main body part 2 (the x-axis positive side) (see FIG. 15 to be described later). The partition wall 34 and the outside wall 36 are formed to prevent the hook 14 from moving to an extent that the ring portion 21 is disengaged from the spindle 31 in the above-described case. That is, even when the tensile force which pulls the ring portion 21 is significantly strong, the partition wall 34 prevents the hook 14 from moving significantly, and thus it is possible to prevent the ring portion 21 from being deformed to a large extent. Further, even when the force pulling the ring portion 21 is significantly strong, the outside wall 36 prevents the hook 14 from moving considerably, and thus it is also possible to prevent the ring portion 21 from being deformed to a large extent.

With reference back to FIG. 4, at one side (at the y-axis position side in FIG. 4) of a top surface of the insertion section 11a, a first recessed portion 15 and a second recessed portion 16 are formed. Each of the recessed portions 15 and 16 are formed at the same side as the hook hole 17. The first recessed portion 15 is formed at a front edge of the one side. The second recessed portion 16 is formed between the first recessed portion 15 and the hook hole 17. The first recessed portion 15 is open upward and laterally. The second recessed portion 16 is also open in the same manner as the first recessed portion 15. Although details will be described later, each of the recessed portions 15 and 16 is formed such that a slide member (a slide member 41 shown in FIG. 8) provided inside the insertion slot 8 moves (slides) integrally with the cartridge 1 when the cartridge 1 is inserted into the insertion slot 8 of the game apparatus 5.

In FIG. 4, to a lower surface (a surface at a z-axis negative side shown in FIG. 4) of the housing 11, the protruding portion 12 is provided in a fixed manner so as to be distanced from the insertion section 11*a* in the z-axis negative direction. That is, there is an air gap between the insertion section 11*a* and the protruding portion 12 in the z-axis direction, and a portion outside the insertion slot 8 is fitted into the air gap. When the cartridge 1 is inserted into the insertion slot 8, the protruding portion 12 is connected to the portion outside the insertion slot 8, i.e., a portion other than the insertion section 11*a*. The protruding portion 12 is connected to the portion other than the insertion section 11*a* so as to protrude forward (in the x-axis positive direction shown in FIG. 4). When the cartridge 1 is inserted into the game apparatus 5, the protruding portion 12 abuts against an outside surface (a surface which faces outside when the game apparatus 5 is folded) of the lower housing 7 of the game apparatus 5. The protruding portion 12 is situated so as to fix and stabilize the cartridge 1 inserted into the game apparatus 5.

(Configuration of Insertion Slot 8)

Figure 8:
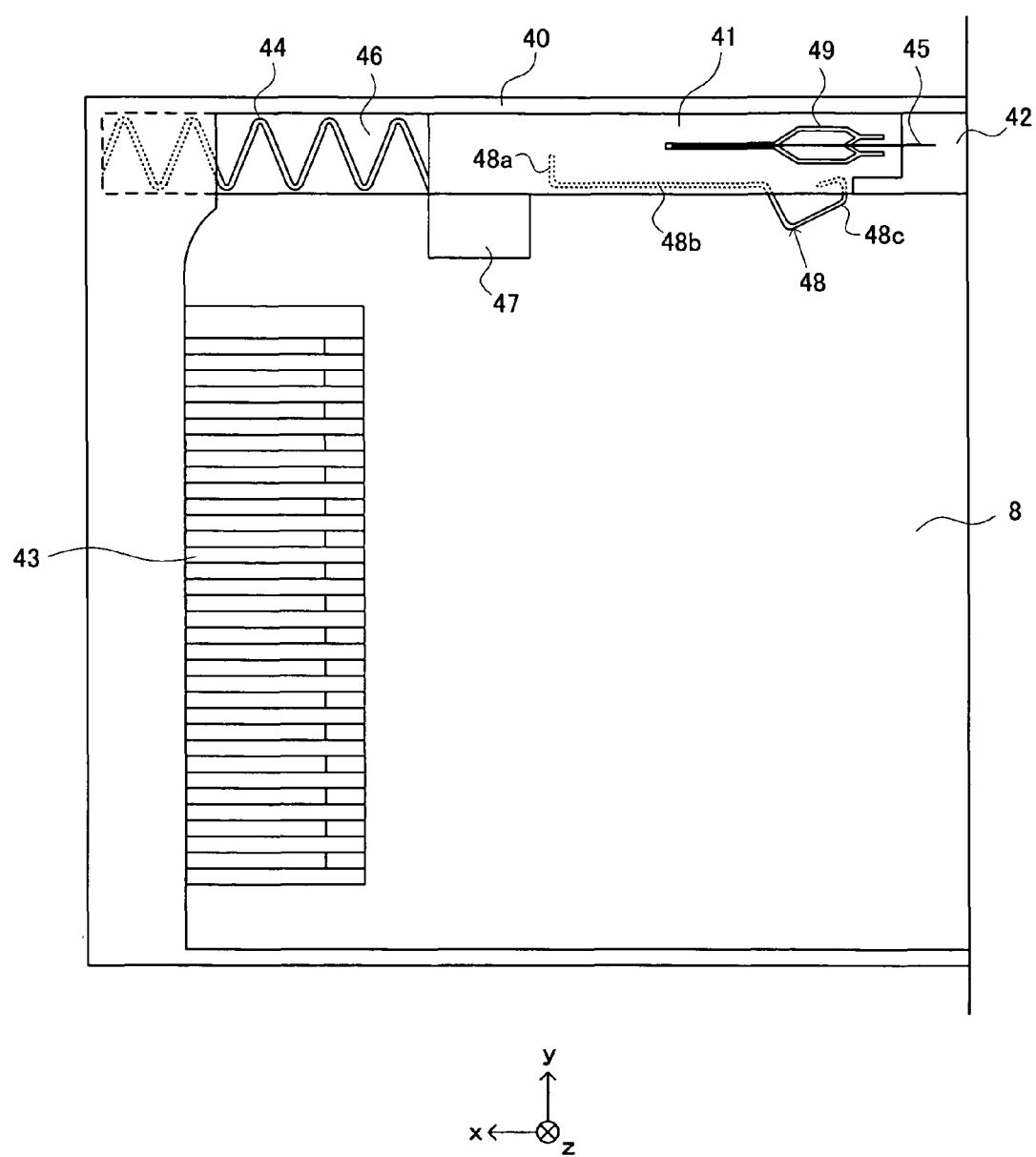
FIG. 8 is a plan view showing a configuration of an insertion slot 8 and its surrounding portion.
Figure 9:
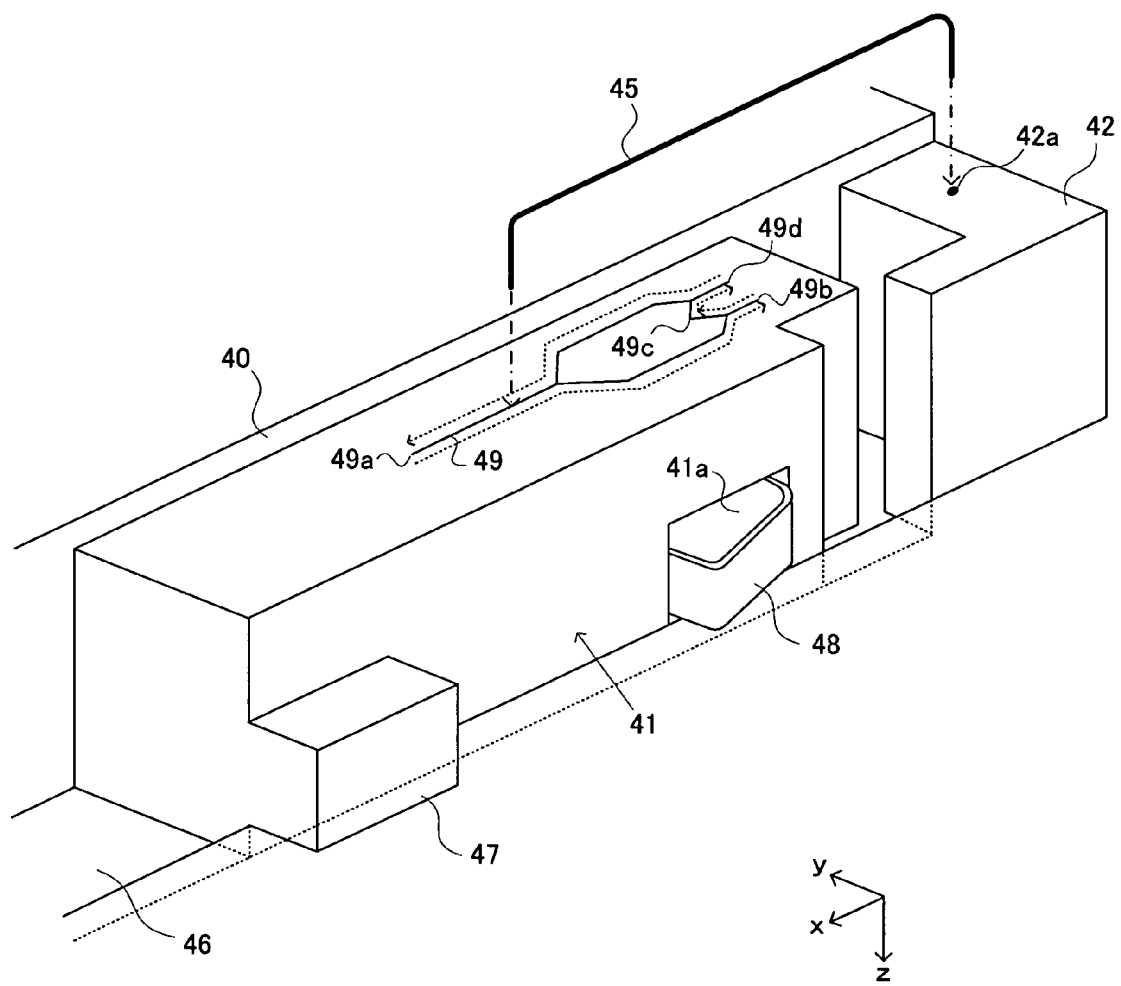
FIG. 9 is a perspective view showing a configuration of a slide member and its surrounding portion provided in the insertion slot 8.

Next, with reference to FIGS. 8 and 8, an internal configuration of the insertion slot 8 of the game apparatus 5 will be described. FIG. 8 is a plan view showing a configuration of the insertion slot 8 and its surrounding portion. FIG. 9 is a perspective view showing a configuration of the slide member and its surrounding portion provided in the insertion slot 8. FIGS. 8 and 9 are each a diagram showing an inside of the insertion slot 8 as viewed from a lower side (a z-axis negative side) toward an upper side in a state where a lower surface of the lower housing is removed. In the following description of the inside of the insertion slot 8, a "near side" represents a side close to the insertion slot 8 (the x-axis negative side shown in FIG. 8), and a "far side" represents a side distanced from the insertion slot 8 (the x-axis positive side shown in FIG. 8).

As shown in FIG. 8, an inside wall 40, the slide member 41, a pin supporting member 42, the connection terminals 43, a spring 44, and a pin 45 are provided to the inside of the insertion slot 8. The connection terminals 43 are designed to electrically connect between the game apparatus 5 and the cartridge 1. The connection terminals 43 are provided at a far side edge on an upper surface (the surface at the z-axis positive side) of the insertion slot 8.

At one side edge portion (an edge portion at the y-axis positive side in FIG. 8) on the upper surface of the insertion slot 8, a groove 46 is formed in a direction from the near side to the far side of the insertion slot 8. A part of the slide member 41 is housed and situated in the groove 46, and the slide member 41 is engaged with the inside wall 40 so as to be slidable along the groove 46 (see FIG. 9). Therefore, the slide member 41 is movable deep inside the insertion slot 8 (the x-axis direction shown in the diagram). The pin supporting member 42 is provided at the near side of the groove 46. The pin supporting member 42 is provided to an opening portion (an edge portion at the near side) of the insertion slot 8 in a fixed manner. The pin supporting member 42 has a function of limiting a movement of the slide member 41 to the near side and also has a function of supporting the pin 45. Both of the functions will be described later. On the other hand, an edge portion, at the far side, of the slide member 41 is firmly fixed to one end of the spring 44. The spring 44 is a compression coil spring, and the other end of the spring 44 is firmly fixed to a surface of the inside wall 40 at the far side. The spring 44 biases the slide member 41 in a direction from the far side to the near side of the insertion slot 8. In FIG. 9, the spring 44 is omitted such that the diagram can be viewed easily. With the above-described configuration, the slide member 41 receives, from the spring 44, a force in a direction from the far side to the near side of the insertion slot 8. Therefore, in a normal state (when the cartridge 1 is not inserted in the insertion slot 8), the slide member 41 is situated at a position abutting against the pin supporting member 42, as shown in FIG. 8.

Further, the pin 45 is an inverted U-shaped bar member as shown in FIG. 9. One end of the pin 45 is inserted into a pin connection hole 42*a* which is formed on a lower surface (a surface at the z-axis negative side) of the pin supporting member 42. Accordingly, the pin 45 is engaged with the pin supporting member 42 so as to be rotatable about an axis in an up-down direction (the z-axis). On the other hand, on a lower surface of the slide member 41 (a surface at the z-axis negative side), a heart cam 49 is provided. The pin 45 is fixed to the pin supporting member 42 such that the other end of the pin 45 is situated inside a cam groove of the heart cam 49 (see chain line arrows shown in FIG. 9). When the slide member 41 moves along the groove 46, the other end of the pin 45 moves unidirectionally along a first end 49*a*, a second end 49*b*, a sharp angle portion 49*c*, a third end 49*d*, and the first end 49*a* in this order (see dotted line arrows shown in FIG. 9). A depth of the cam groove of the heart cam 49 is adjusted such that the other end of the pin 45 moves as above described.

Further, the slide member 41 has a projecting portion 47 and a protruding member 48. The projecting portion 47 is formed on a side of the slide member 41, the side being opposite to that abutting against the inside wall 40. The projecting portion 47 is shaped so as to be engaged with the first recessed portion 15 of the cartridge 1. The protruding member 48 is made from metal or the like, and is formed by folding a planar material. The protruding member 48 has a fixing portion 48*a*, a shank portion 48*b*, and a protruding portion 48*c*. The fixing portion 48*a* is one end of the protruding member 48, and firmly fixed to the slide member 41 in an inside thereof. One end of the shank portion 48*b* is connected to the fixing portion 48*a*, and the other end thereof is connected to the protruding portion 48*c*. The protruding portion 48*c* protrudes outward from a hole 41*a* provided in the slide member 41. A size of the protruding portion 48*c* is such that the protruding portion 48*c* is housed in the second recessed portion 16 of the cartridge 1. The protruding member 48 is firmly fixed to the slide member 41 such that the protruding portion 48*c* protrudes to a side at which the projecting portion 47 is formed (that is, the side of the slide member 41, the side being opposite to that abutting against the inside wall 40). Only the fixing portion 48*a* of the protruding member 48 is fixed to the slide member 41. Therefore, when a force is applied to the protruding portion 48*c* so as to push the protruding portion 48*c* toward the inside of the slide member 41, the shank portion 48*b* is deformed (bent), and accordingly, the protruding portion 48*c* is housed inside the slide member 41.

Although details will be described later, with the above-described heart cam mechanism (the heart cam 49 and the pin 45), it is possible to stop the slide member 41, which is biased in the direction from the far side to the near side, at a predetermined position in the far side. Accordingly, when the cartridge 1 is inserted into a far side end of the insertion slot 8, the cartridge 1 can be mounted into the insertion slot 8. When the cartridge 1 is pushed into the far side end of the insertion slot 8 while the cartridge 1 is mounted in the insertion slot 8, the cartridge 1 can be ejected from the insertion slot 8 (FIGS. 10 to 14). In other words, the insertion slot 8 according to the present embodiment has a push-in/push-out insertion/ejection mechanism.

(Operation When Cartridge 1 is Loaded)

Next, with reference to FIGS. 10 to 14, an operation of the main body part 2 of the cartridge 1 and operations of respective component parts provided in the insertion slot 8 of the game apparatus 5 will be described, when the cartridge 1 is inserted into the insertion slot 8 of the game apparatus 5. Each of FIGS. 10 to 14 shows a state where the insertion section 11a of the cartridge 1 is inserted into the insertion slot 8. In the same manner as FIG. 8, each of FIGS. 10 to 14 shows an upper inside of the insertion slot 8 as viewed from a lower side (the z-axis negative side) in a state where the lower surface of the lower housing 7 is removed.

Figure 10:
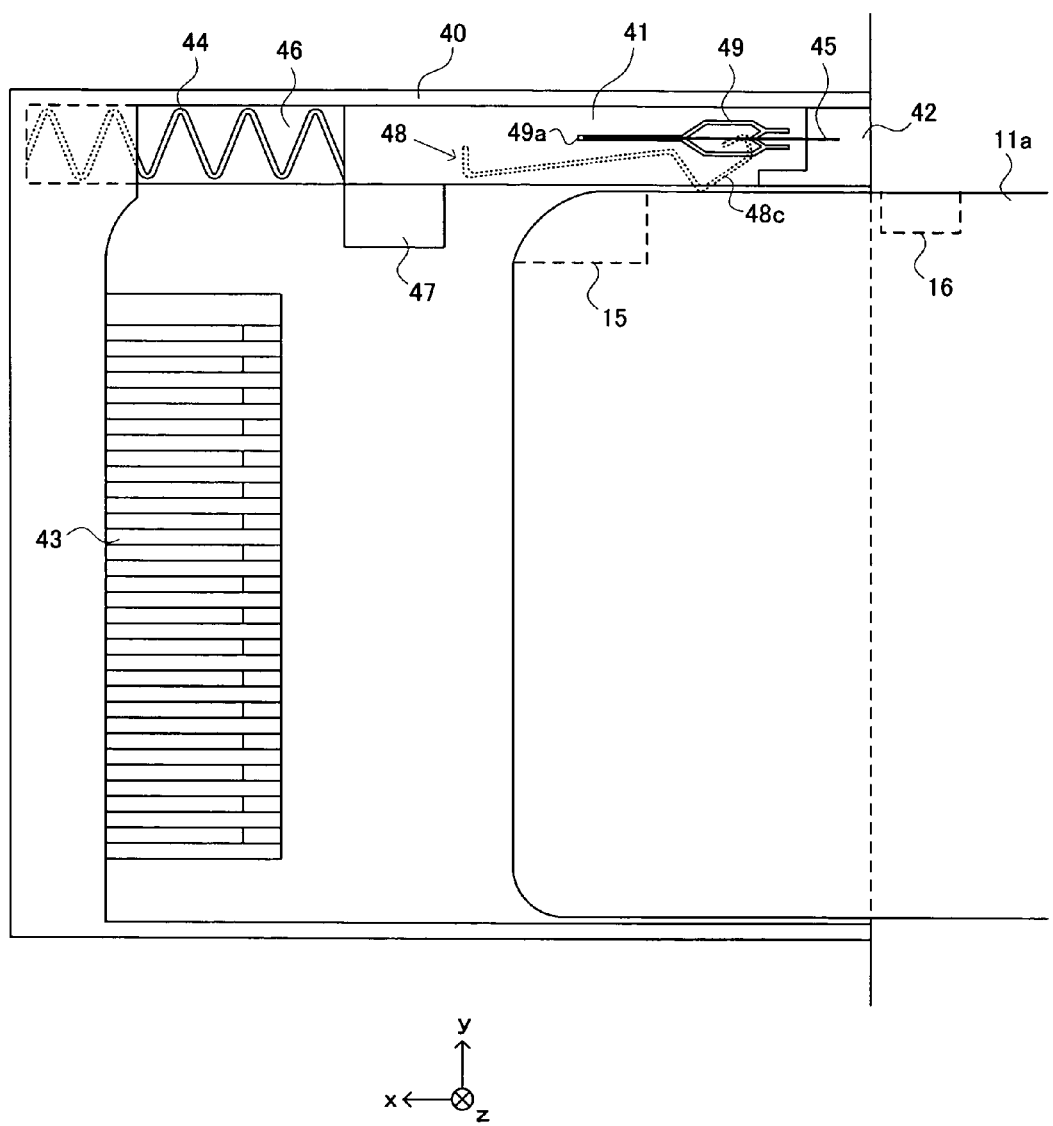
FIG. 10 is a diagram showing a state immediately after the insertion section 11a of the cartridge 1 is inserted into the insertion slot 8.

FIG. 10 is a diagram showing a state immediately after the insertion section 11a of the cartridge 1 is inserted into the insertion slot 8. As shown in FIG. 10, the cartridge 1 is inserted into the insertion slot 8 such that the upper surface (a surface at the z-axis positive side) of the insertion section 11a faces the upper side of the insertion slot 8. In other words, the insertion section 11a of the main body part 2 is inserted such that the one side of the insertion section 11a, on which both of the recessed portions 15 and 16 are formed, faces one side of the insertion slot 8 on which the slide member 41 is provided. As shown in FIG. 10, when the insertion section 11a is inserted into the insertion slot 8, and a side surface of the insertion section 11a abuts against the protruding member 48, then the protruding portion 48c of the protruding member 48 is pushed by the side surface, and is consequently housed inside the slide member 41. In this case, elastic forces of the spring 44 and protruding member 48 are each designed so as not to cause the slide member 41 to move.

Figure 11:
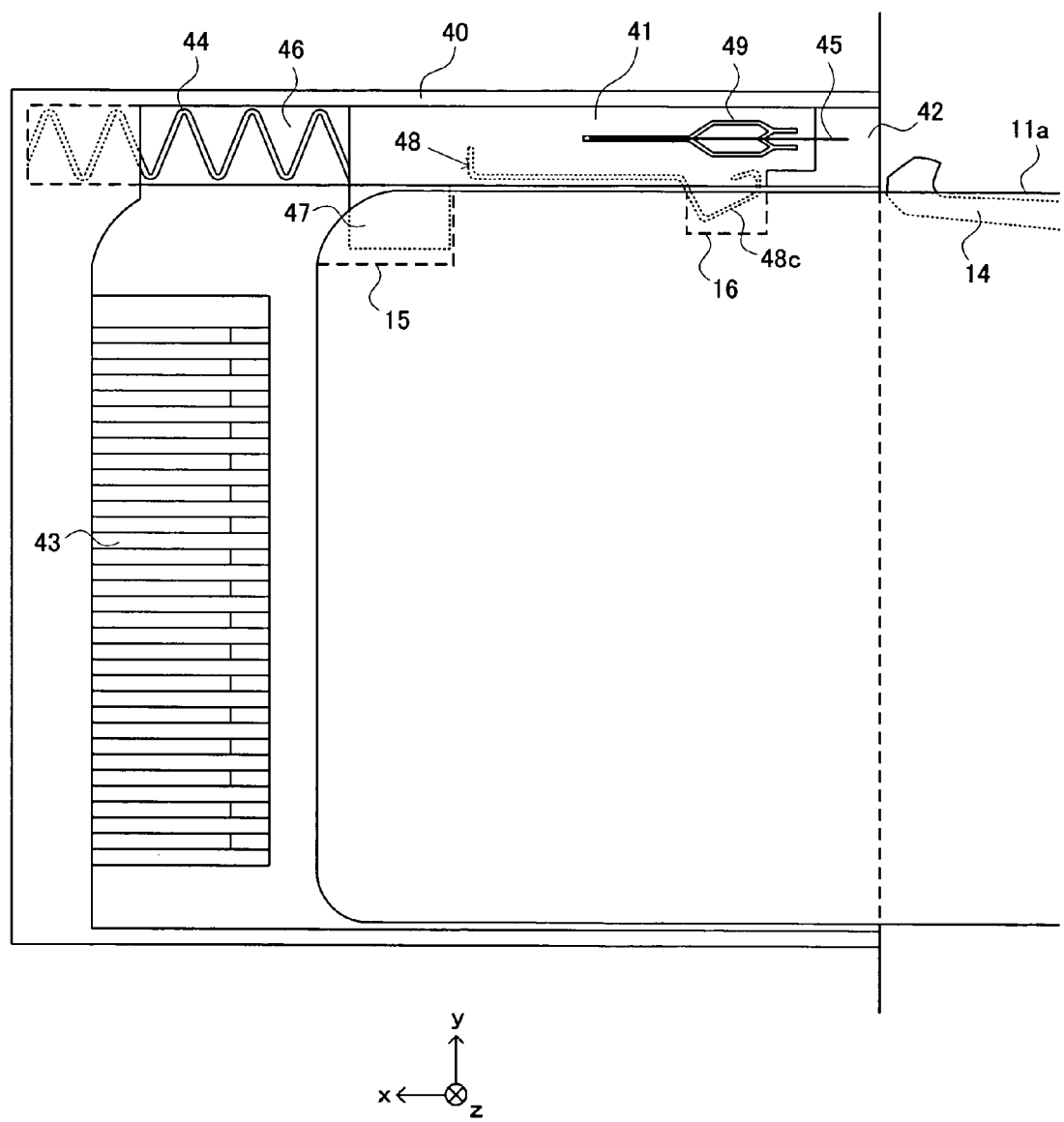
FIG. 11 is a diagram showing a state where the insertion section 11a of the cartridge 1 is inserted deeper inside than the state shown in FIG. 10.

FIG. 11 is a diagram showing a state where the insertion section 11a of the cartridge 1 is inserted deeper inside than the state shown in FIG. 10. As shown in FIG. 11, when the insertion section 11a of the cartridge 1 is inserted deeper into the insertion slot 8, the first recessed portion 15 formed on the insertion section 11a and the projecting portion 47 formed on the slide member 41 are engaged with each other. That is, a rear side surface (a surface at the x-axis negative side shown in the diagram) of the first recessed portion 15 abuts against a near side surface (at the x-axis negative side shown in the diagram) of the projecting portion 47. Therefore, when the insertion section 11a of the cartridge 1 is inserted further deeper into the far side of the insertion slot 8 than the state shown in FIG. 11, the cartridge 1 moves integrally with slide member 41. An interval between the first recessed portion 15 and the second recessed portion 16 is designed so as to be equal to an interval between the projecting portion 47 and the protruding portion 48c. Therefore, under a state where the first recessed portion 15 is engaged with the projecting portion 47, the protruding portion 48c is inserted inside the second recessed portion 16 (see FIG. 11).

Figure 12:
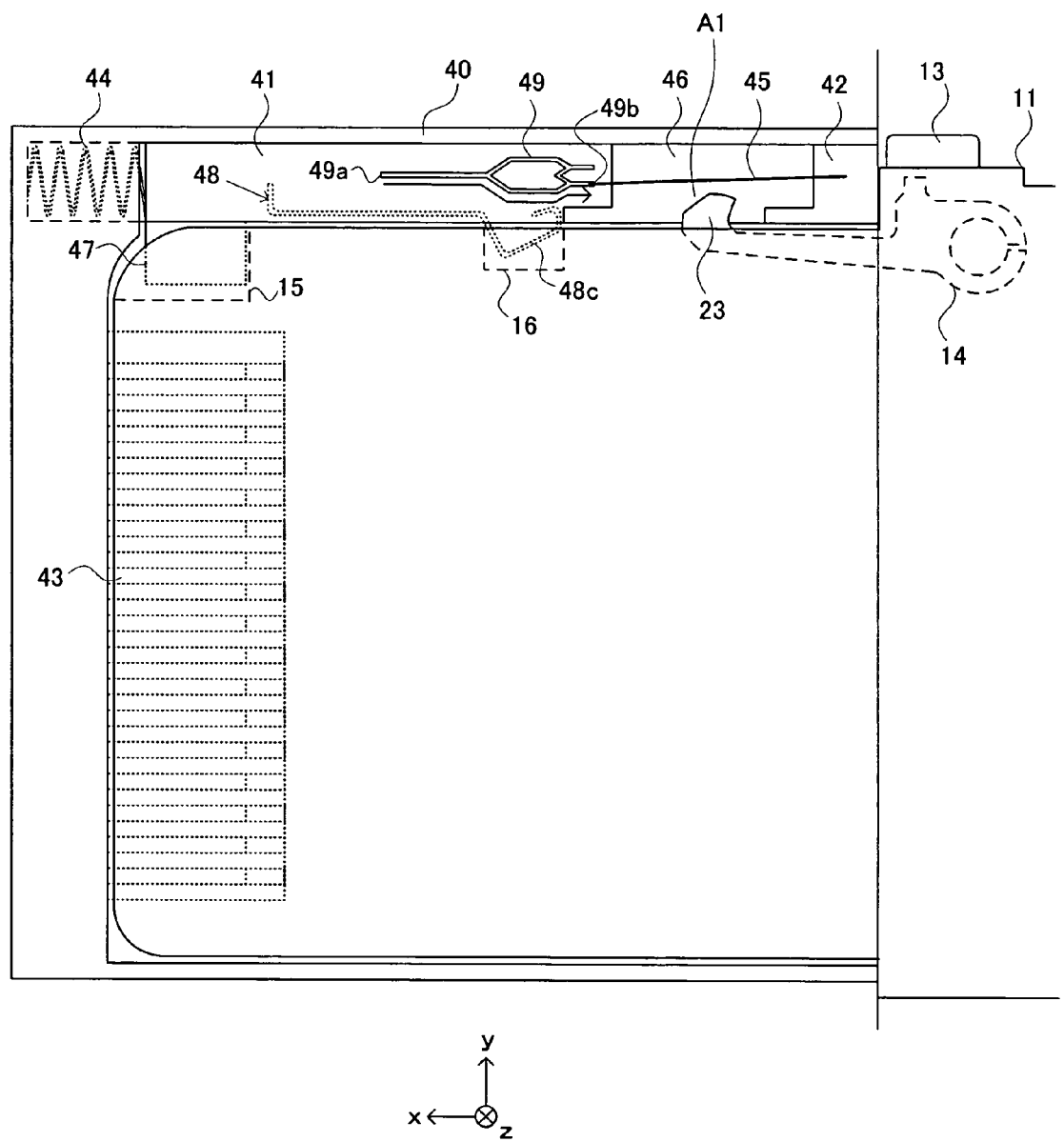
FIG. 12 is a diagram showing a state where the insertion section 11a of the cartridge 1 is inserted further deeper inside than the state shown in FIG. 11.

FIG. 12 is a diagram showing a state where the insertion section 11a of the cartridge 1 is inserted further deeper inside than the state shown in FIG. 11. In FIG. 12, the front edge of the insertion section 11a of the cartridge 1 abuts against the inside wall at the far side end of the insertion slot 8. As above described, when the cartridge 1 moves further deeper into the far side of the insertion slot 8 from the state where the first recessed portion 15 is engaged with the projecting portion 47, the cartridge 1 moves integrally with the slide member 41. Therefore, when the slide member 41 slides deep inside, an air gap A1 is generated between the slide member 41 and the pin supporting member 42. Accordingly, if the slide member 41 and the pin supporting member 42 are regarded as apart of an inner side surface of the insertion slot 8, a recessed portion is created on the side surface inside the insertion slot 8. As shown in FIG. 12, the latch portion 23 of the hook 14 is inserted into the recessed portion. When the state shown in FIG. 11 shifts to the state shown in FIG. 12, the latch portion 23 abuts against the pin supporting member 42. In this state, the latch portion 23 is pushed by the pin supporting member 42, and thus the hook 14 rotates, whereby the latch portion 23 is housed inside the insertion section 11a. As shown in FIG. 12, when the slide member 41 moves integrally with the cartridge 1, a position of the end of pin 45 changes from a first end 49a to the second end 49b of the heart cam 49 (see an arrow shown in FIG. 12). A length of the pin 45, and a shape and a size of the heart cam 49 are designed such that the end of the pin 45 is positioned at the second end 49b of the heart cam 49 when the front edge of the insertion section 11a of the cartridge 1 abuts against the inside wall at the far side end of the insertion slot 8

Figure 13:
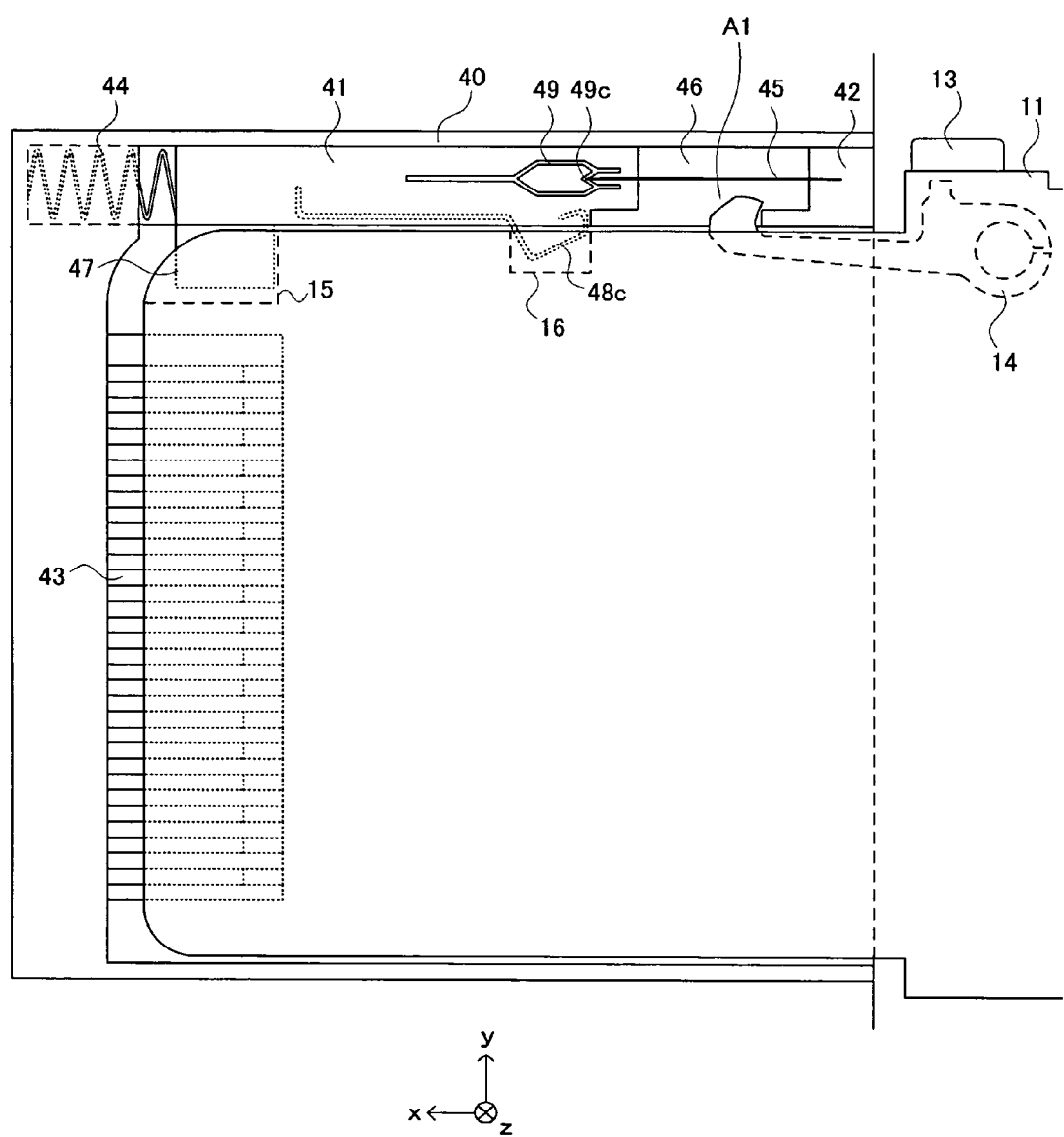
FIG. 13 is a diagram showing a state where a user has released the hand from the cartridge 1 after inserting the insertion section 11a, which is the state shown in FIG. 12.

FIG. 13 is a diagram showing a state where a user has released the hand from the cartridge 1 after inserting insertion section 11a, which is the state shown in FIG. 12. When the front edge of the insertion section 11a of the cartridge 1 abuts against the inside wall at the far side end of the insertion slot 8 (FIG. 12), the spring 44 biases the slide member 41 in a direction from the far side to the near side of the insertion slot 8. Therefore, when the user stops inserting the insertion section 11a and releases the hand from the cartridge 1 in the above-described state, the slide member 41 and the cartridge 1 move to the near side of the insertion slot 8. In accordance with this movement of the slide member 41, the end of the pin 45 moves from the second end 49b to the sharp angle portion 49c of the heart cam 49. Further, when the end of the pin 45 is positioned at the sharp angle portion 49c of the heart cam 49, the latch portion 23 of the hook 14 latches onto the side surface inside the insertion slot (specifically, on the pin supporting member 42) (that is, sizes of the hook 14 and the pin supporting member 42 are designed to be latched onto each other). Therefore, as shown in FIG. 13, when the end of the pin 45 latches onto the sharp angle portion 49c of the heart cam 49, and the latch portion 23 of the hook 14 latches onto the pin supporting member 42, then the slide member 41 and the cartridge 1 are fixed. Accordingly, the cartridge 1 is mounted in the game apparatus 5. When the cartridge 1 is mounted, the connection terminals 18 provided to the insertion section 11a of the cartridge 1 abuts against the connection terminals 43 provided to the far side end of the insertion slot 8. Therefore, the cartridge 1 is electrically connected to the game apparatus 5. Accordingly, the game apparatus 5 is capable of receiving digital broadcasting via the cartridge 1.

If the hook 14 is not provided while the cartridge 1 is fixed as above described, the cartridge 1 and the game apparatus 5 are fixed together only by latching the protruding member 48 of the slide member 41 of the game apparatus 5 onto the second recessed portion 16 of the cartridge 1. As above described, when a force is applied to the protruding member 48, the protruding member 48 is housed inside the slide member 41. Therefore, when the cartridge 1 is fixed only with the protruding member 48, the cartridge 1 may be released from the slide member 41 (the protruding member 48 is disengaged from the second recessed portion 16) only with a little force, and may be dismounted from the insertion slot 8. Typically, when the user pulls the cartridge 1, or when the game apparatus 5 is dropped and receives an impact of such drop, the cartridge 1 may be dismounted from the insertion slot 8. On the other hand, according to the present embodiment, the cartridge 1 is engaged with the insertion slot 8 not only with the protruding member 48 of the slide member 41 but also with the hook 14. Therefore, compared to a case where the cartridge 1 is engaged with the insertion slot 8 only with the protruding member 48, it is possible to fix the cartridge 1 to the insertion slot 8 solidly.

Figure 14:
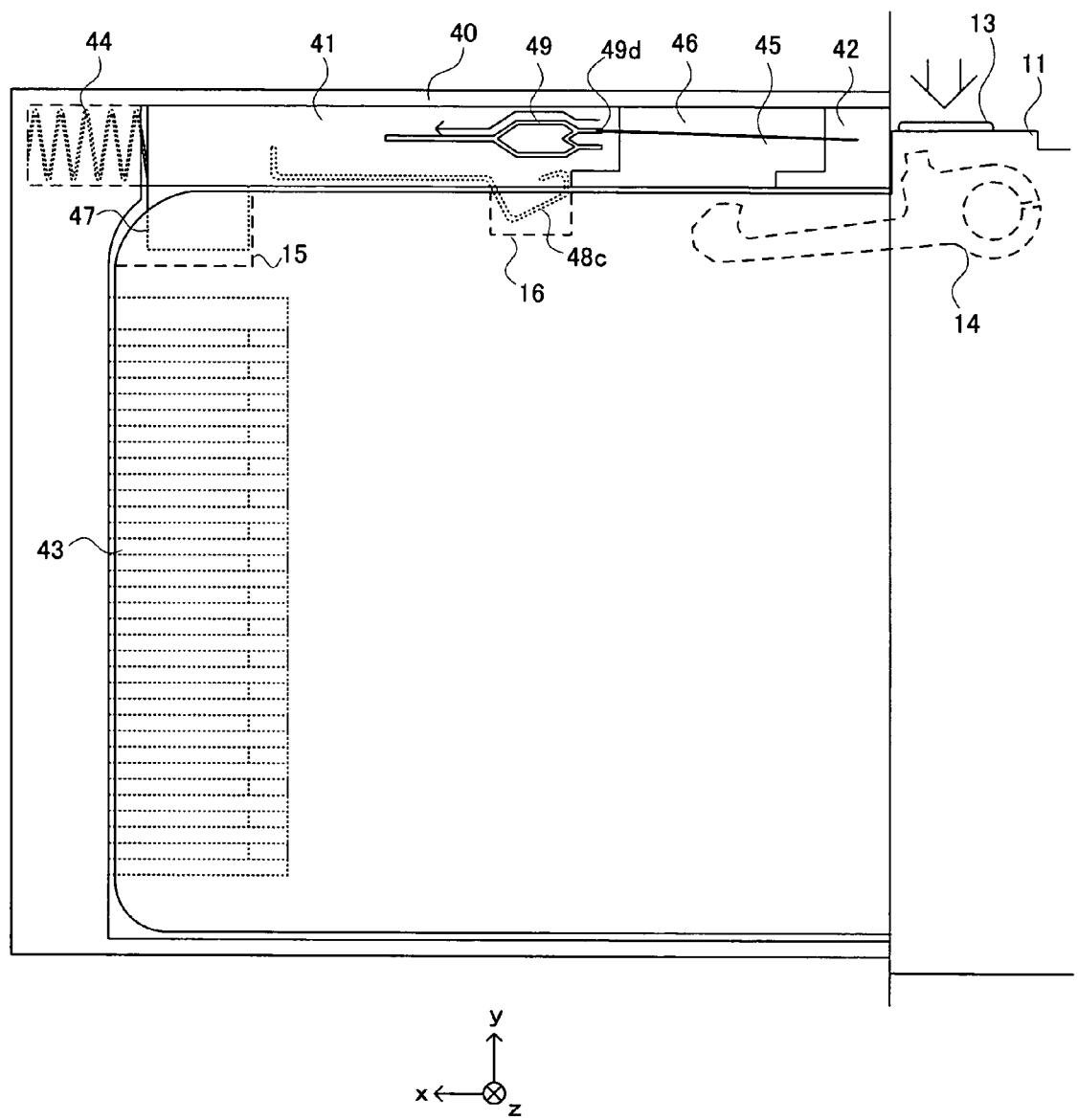
FIG. 14 is a diagram showing a state where the cartridge 1 is ejected from the insertion slot 8 from the state shown in FIG. 13.

FIG. 14 is a diagram showing a state where the cartridge 1 is ejected from the insertion slot 8 from the state shown in FIG. 13. When the cartridge 1 is to be ejected from the insertion slot 8, the user again pushes the cartridge 1, which is mounted in the insertion slot 8 (in the state shown in FIG. 13), to the far side end of the insertion slot 8. Accordingly, the slide member 41 moves integrally with the cartridge 1, and the position of the end of the pin 45 changes from the sharp angle portion 49c to the third end 49d. Further, the user presses the button 13 of the cartridge 1 while the insertion section 11a of the cartridge 1 is inserted deep in the far side end of the insertion slot 8. Accordingly, the latch portion 23 of the hook 14 is housed inside the housing 11 (see FIGS. 7 and 14). Accordingly, the latch portion 23 of the hook 14, which is latched onto the pin supporting member 42, has been released therefrom. Accordingly, the cartridge 1 is moved to the near side of the insertion slot 8 while the button 13 is being pressed, whereby it is possible to eject the cartridge 1 from the insertion slot 8. That is, in this state, the pin 45 moves from the third end 49d to the first end 49a (see an arrow shown in FIG. 14), and thus the end of the pin 45 is not latched onto the sharp angle portion 49c of the heart cam 49. Further, the hook 14 is not latched onto the pin supporting member 42. Accordingly, the cartridge 1 is ejected from the insertion slot 8.

As above-described, according to the present embodiment, the hook 14 is included in the cartridge 1, and when the cartridge 1 is mounted into the insertion slot 8, the hook 14 is latched onto a predetermined portion (the pin supporting member 42 in the present embodiment) inside the insertion slot 8. Accordingly, it is possible to solidly fix the cartridge 1 to the game apparatus 5. Further, the insertion slot 8 in the present embodiment is configured with the conventional push-in/push-out insertion/removable mechanism. In other words, according to the present embodiment, it is possible to fix the attachment device (cartridge 1) to the electronic apparatus without additionally providing the electronic apparatus (game apparatus 5) with a mechanism for preventing the attachment device from being dismounted.

In the present embodiment, it is possible to solidly fix the cartridge 1 to the game apparatus 5 with the hook 14. When a strong force is applied to the cartridge 1 which is mounted in the game apparatus 5, the strong force is also applied to the hook 14. When an impact is applied to the cartridge 1, for example in the case where the user accidentally drops the game apparatus 5 having the cartridge 1 mounted therein or bumps the same against some material, a strong force is applied to the cartridge 1 in a direction such that the cartridge 1 is dismounted from the insertion slot 8. In this case, the strong force is applied to the latch portion 23 of the hook 14, and consequently the hook 14 may be broken. Typically, the hook 14 may be folded down at the connecting portion between the arm 22 and the latch portion 23. Particularly, under a situation where the cartridge 1 protrudes outside from the insertion slot 8, as with the case of the present embodiment, when the user accidentally drops the game apparatus 5 having the cartridge 1 mounted therein or bumps the same with some material, the strong force is likely to be applied to the cartridge 1, and consequently the hook 14 is likely to be broken.

Figure 15:
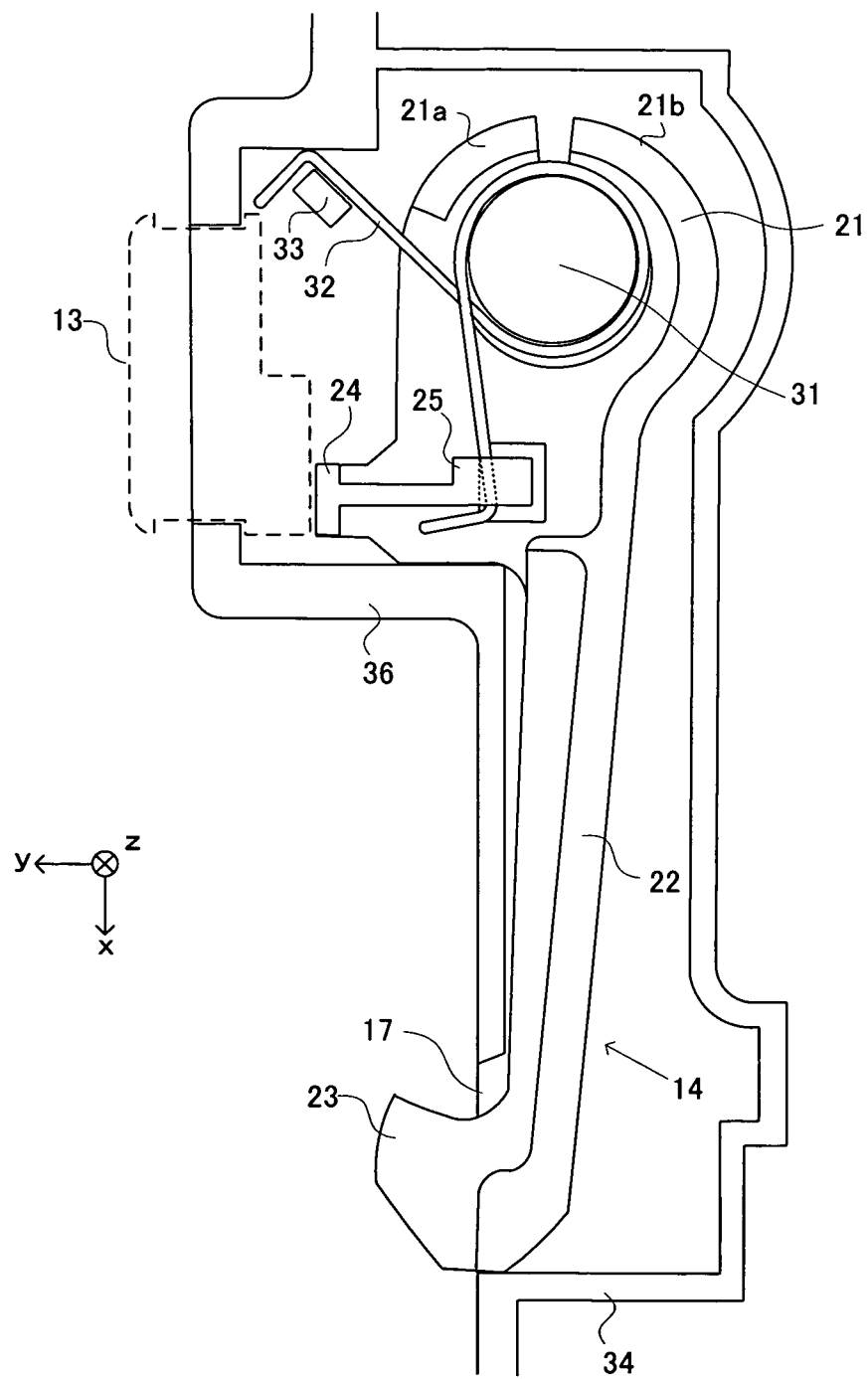
FIG. 15 is a diagram showing a hook 14 in the case where a force is applied in a direction such that the cartridge 1 is to be dismounted.

Therefore, in the present embodiment, a slit is provided to the ring portion 21 of the hook 14, whereby the force applied to the latch portion 23 of the hook 14 is reduced. FIG. 15 is a diagram showing the hook 14 in a state where a force is applied to the cartridge 1 in a direction such that the cartridge 1 is to be dismounted from the game apparatus 5, while the cartridge 1 is mounted in the game apparatus 5. When the force is applied to the cartridge 1 in the direction such that the cartridge 1 is to be dismounted, a force is applied to the latch portion 23 of the hook 14 from the pin supporting member 42 toward the x-axis positive direction shown in the diagram. In this case, the ring portion 21 receives a tensile force (tension) from the arm 22 in a direction toward the arm 22. In the present embodiment, since the slit is provided to the ring portion 21 of the hook 14, when the above-described tension is applied to the ring portion 21, the ring portion 21 become deformed as shown in FIG. 15. That is, the ring portion 21 is deformed such that the two forearm portions 21a and 21b thereof open out. Further, when the ring portion 21 is deformed, the hook 14 is moved toward the x-axis positive direction (FIG. 15). Since the force applied to the latch portion 23 is eased by the deformation of the ring portion 21 and movement of the hook 14, it is possible to prevent the hook 14 from being broken. Further, in the case where the force applied to the latch portion 23 is released, the hook 14 is returned to the original position due to a restoring force of the deformed ring portion 21.

Further, in the present embodiment, with respect to the hook housing portion (housing 11) of the cartridge 1, the partition wall 34 is provided at the x-axis positive side of the hook 14. Therefore, when the hook 14 is moved toward the x-axis positive side, the end of the hook 14 at the x-axis positive side abuts against the partition wall 34, whereby the movement of the hook 14 is limited. Accordingly, it is possible to prevent the ring portion 21 from being disengaged completely from the spindle 31. In the present embodiment, at the x-axis positive side of the connecting portion 22a between the ring portion 21 and the arm 22, the outside wall 36 of the housing 11 is provided. Therefore, in the present embodiment, the movement of the hook 14 is also limited by the outside wall 36.

As above described, according to the present embodiment, it is possible to engage the cartridge 1 with the insertion slot 8 of the game apparatus 5 by using the hook 14, whereby it is possible to solidly mount the cartridge 1 into the game apparatus 5. Further, the slit is provided to the ring portion 21 of the hook 14, whereby it is possible to cause the hook 14 to be deformed when the strong force is applied to the hook 14. Accordingly, it is possible to prevent the hook 14 from being broken.

Modified Embodiment of Hook

In the above-described embodiment, in order to prevent the hook 14 from being broken, a cut (slit) is formed in the ring portion 21. Here, the slit may be formed at any position of the ring portion 21, and preferably, the slit is formed at a position opposite to the connecting portion 22a between the ring portion 21 and the arm 22. Accordingly, when the hook 14 moves, a force is equally applied to both of the forearm portions 21a and 21b, which sandwich the slit of the ring portion 21. Consequently, a degree of the deformation of the ring portion 21 is small, which prevents the hook 14 from being broken easily.

Further, in the above-described embodiment, a slit is provided in the ring portion 21 in order to prevent the hook 14 from being broken. The ring portion may be configured so as to be deformable in the case where the tensile force from the arm is applied to the ring portion while the ring portion is pivoted by the spindle (i.e., in the case where a force is applied to the hook such that the hook is moved away from the spindle). Hereinafter, with reference to FIGS. 18 and 19, modified embodiments of the hook will be described.

Figure 16:
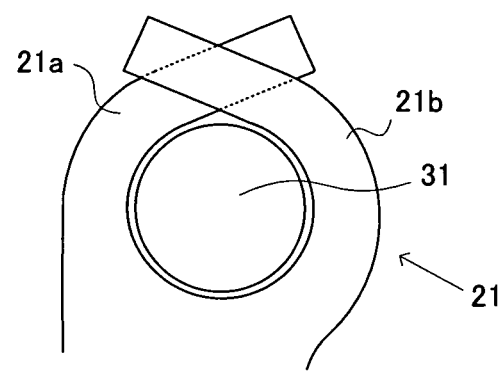
FIG. 16 is a diagram showing a ring portion 21 of the hook 14 according to a first modified embodiment.

FIG. 16 is a diagram showing the ring portion 21 of the hook 14 according to a first modified embodiment. As shown in FIG. 16, in the first modified embodiment, at the side opposite to the connecting portion with the arm 22, the two forearm portions 21a and 21b are configured so as to be partially overlapped with each other. In other words, at the side opposite to the connecting portion with the arm 22, the ring portion 21 is not connected through, but has portions which are vertically overlapped with each other. The configuration shown in FIG. 16 also causes the ring portion 21 to be deformed in the case where the tensile force from the arm is applied to the ring portion 21. Further, in the case where the tensile force applied thereto is released, the ring portion 21 is returned to an original state and pivoted due to the restoring force. Therefore, when the hook 14 shown in FIG. 16 is used, the same effect as the above-described embodiment can be achieved. In the case where the configuration shown in FIG. 16 is applied, it is possible to extend a movable distance of the hook 14 (a distance in which the hook 14a is movable without the ring portion 21 being disengaged from the spindle 31) compared to a case of the above-described embodiment.

Figure 17:
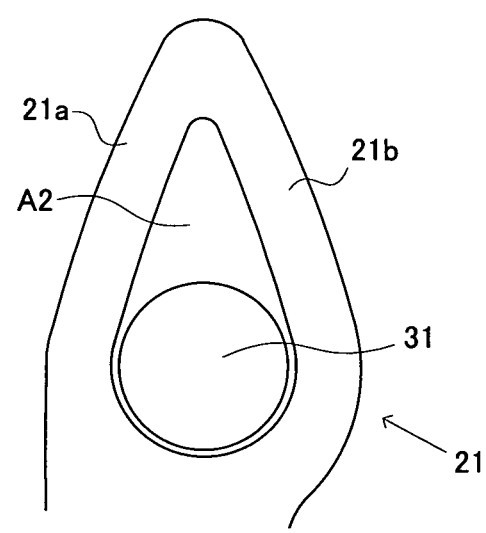
FIG. 17 is a diagram showing the ring portion 21 of the hook 14 according to a second modified embodiment.

FIG. 17 is a diagram showing the ring portion 21 of the hook 14 according to a second modified embodiment. As shown in FIG. 17, in the second modified embodiment, the two forearm portions 21a and 21b grasp the spindle 31 so as to form an air gap A2 between the spindle 31 and the forearm portions 21 and 21b at the side opposite to the connecting portion between the ring portion 21 and the arm 22. A width of the air gap A2 (a length in a direction perpendicular to a normal line direction of the spindle 31) is designed to be smaller than a diameter of the spindle 31. Further, in FIG. 17, front ends of the two forearm portions 21a and 21b are connected to each other. However, the front ends of the two forearm portions 21a and 21b do not need to be connected to each other. With the configuration shown in FIG. 17, the ring portion 21 is also deformable in the case where the tensile force from the arm is applied thereto. When the tensile force applied thereto is released, the ring portion 21 is returned to the original state and pivoted due to the restoring force. Therefore, by using the hook 14 shown in FIG. 17, it is possible to achieve the same effect as above-described embodiment. When the configuration shown in FIG. 17 is applied, the ring portion 21 is not disengaged from the spindle 31.

Modified Embodiment of Partition Wall

Figure 18:
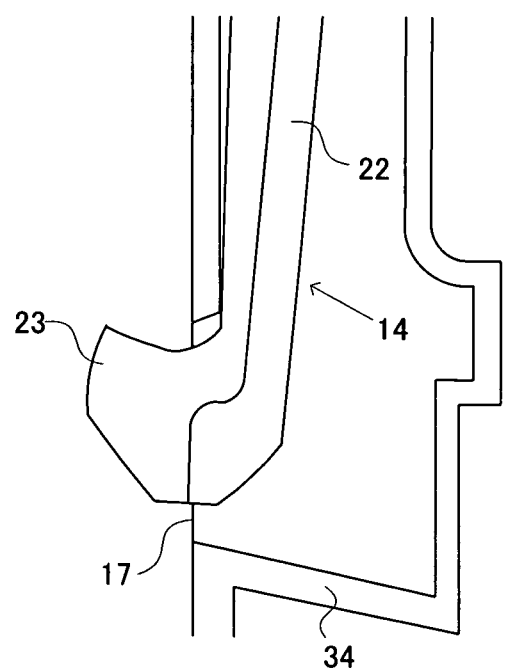
FIG. 18 is a diagram showing a configuration of a partition wall 34 according to another embodiment.
Figure 19:
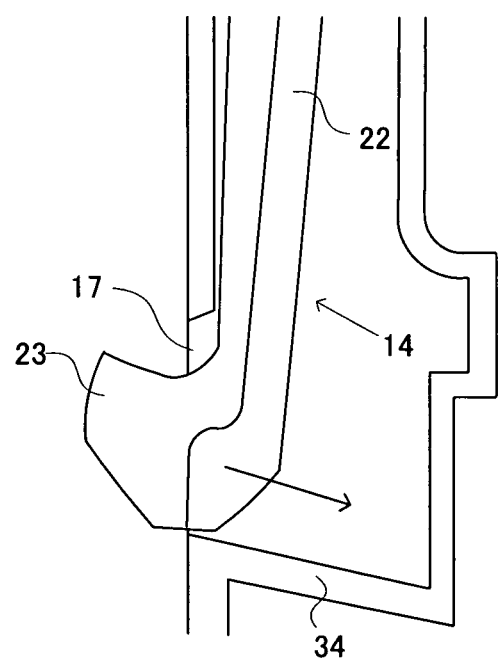
FIG. 19 is a diagram showing a case where, in the configuration shown in FIG. 18, the hook 14 abuts against the partition wall 34.

In the above-described embodiment, the partition wall 34 shown in FIG. 6 is arranged so as to be substantially perpendicular to the moving direction of the hook 14 (at the x-axis positive side). In an alternative embodiment, the partition wall 34 may be arranged such that the latch portion 23 is moved to be housed inside the insertion section 11a when the hook 14 collides against the partition wall 34. FIG. 18 is a diagram showing a configuration of the partition wall 34 in another embodiment. In FIG. 18, the partition wall 34 is arranged so as to be angled with respect to a direction perpendicular to the moving direction of the hook 14. Specifically, the partition wall 34 is formed such that the hook hole 17 widens as it goes from an opening portion thereof to an inside of the insertion section 11a. FIG. 19 is a diagram showing a case where, in the configuration shown in FIG. 18, the hook 14 abuts against the partition wall 34. When the ring portion 21 is deformed by a large force applied to the hook 14, and consequently the hook 14 is moved, then the latch portion 23 of the hook 14 collides against the partition wall 34 as shown in FIG. 19. In this case, since the partition wall 34 is formed so as to be angled with respect to a direction perpendicular to the moving direction (the x-axis positive direction) of the hook 14, the latch portion 23 of the hook 14 which has collided against the partition wall 34, is moved and housed inside the insertion section 11a. Therefore, the state, where the latch portion 23 is latched onto the predetermined portion inside the insertion slot 8 (the pin supporting member 42), is released, and then the hook 14 is disengaged from the predetermined portion. The hook 14 is disengaged from the predetermined portion, and a large force having been applied to the hook 14 is released. Accordingly, it is possible to securely prevent the hook 14 from being broken. In the above-described embodiment, the partition wall of a planar shape is used as a material for limiting the movement of the hook 14, however, a bar-shape (columnar-shape) material may be used.

Modified Embodiment of Insertion Slot 8

In the above-described embodiment, the insertion slot 8 of the game apparatus 5 has the so-called push-in/push-out insertion/rejection mechanism. However, in another embodiment, the structure of the insertion slot 8 is not limited to this. The insertion slot 8 may be of any configuration as long as a portion which is latched onto by the latch portion 23 of the hook 14 is situated inside the insertion slot 8. Further, in another embodiment, the hook included in the attachment device (cartridge 1) is not limited to such a hook that latches onto a surface inside the insertion slot of the electronic apparatus (game apparatus 5). The hook may be such a hook that latches onto a predetermined portion of the electronic apparatus. For example, there may be adopted a configuration in which a hook is provided to the protruding portion 12 of the cartridge 1, and the hook latches onto the outside surface of the insertion slot 8 of the game apparatus 5.

As above described, an aspect of example embodiments of the present invention is to provide a highly impact-resistant hook. Example embodiments of the present invention are applicable to a device latch hook or the like for causing an attachment device, which is to be mounted into the electronic apparatus, to latch onto an electronic apparatus such as a game apparatus.

While example embodiments of the invention have been described in detail, the foregoing description is in all aspects illustrative and not restrictive. It is understood that numerous other modifications and variations can be devised without departing from the scope of the invention.

What is claimed is:

1. A hook which is provided to an attachment device so as to prevent the attachment device mounted into an insertion slot of an electronic apparatus from being dismounted from the insertion slot, the hook comprising:
    a ring portion which is formed at one end of the hook and which is pivoted by a spindle situated in the attachment device;
    a latch portion which is formed at the other end of the hook and which is caused, by the ring portion rotating around the spindle, to be switched between a latched state, in which the hook is latched onto a predetermined portion of the electronic apparatus, and a non-latched state; and
    an arm for connecting between the ring portion and the latch portion, wherein
    the ring portion is shaped so as to be deformed when a force is applied from the arm thereto, the force being caused by the attachment device moving so as to be ejected from the insertion slot in the latched state, and the ring portion is shaped so as to include a slit which completely intersects the ring portion from an inner circumference thereof to an outer circumference thereof, and the inner circumference is smaller than and concentric with the outer circumference.

2. The hook according to claim 1, wherein the slit is situated at a side opposite to a portion connecting between the ring portion and the arm.

3. The hook according to claim 1, wherein the ring portion has two forearm portions which grasp the spindle.

4. The hook according to claim 3, wherein the ring portion is configured such that the two forearm portions are partially overlapped with each other.

5. The hook according to claim 3, wherein the two forearm portions of the ring portion grasp the spindle such that an air gap having a width smaller than a diameter of the spindle is formed between the spindle and the two forearm portions at a side opposite to a portion connecting between the ring portion and the arm.

6. An attachment device mountable into an insertion slot arranged in an electronic apparatus, the attachment device comprising:

the hook according to claim 1;

a housing which has a hook hole situated at a portion to be inserted into the insertion slot, and which has a spindle formed thereinside so as to pivot the ring portion;

an elastic material which is provided inside the housing, and which biases the hook such that the latch portion of the hook is exposed outward from the hook hole of the housing; and a button which causes the elastic material to be deformed elastically such that the latch portion is housed inside the housing, and which is controllable outside the housing.

7. The attachment device according to claim 6, wherein a movement limiting portion is provided in the housing such that a moving range of the hook is limited so as not to cause the ring portion to be disengaged from the spindle when a force is applied to the ring portion, the force being caused by the attachment device moving so as to be ejected from the insertion slot.

8. The attachment device according to claim 7, wherein, when the hook collides against the movement limiting portion, the movement limiting portion causes the latch portion to move so as to be housed inside the housing.

9. An electronic apparatus system comprising:

the attachment device according to claim 6; and an electronic apparatus which has an insertion slot for receiving the attachment device mounted thereinto, and which has a portion latched onto by the hook, the portion being formed on a wall surface inside the insertion slot.

10. A hook for causing an attachment device, which is mounted into an insertion slot arranged in an electronic apparatus, to be latched onto the insertion slot, the hook comprising:

a ring portion which is formed at one end of the hook and which is of a ring shape;

a latch portion which is formed at the other end of the hook and which is latchable onto a predetermined portion of the electronic apparatus; and an arm for connecting between the ring portion and the latch portion, wherein the ring portion is shaped so as to be deformed when a tensile force from the arm is applied thereto under a state where the ring portion is pivoted by a spindle of the attachment device, and the ring portion is shaped so as to include a slit which completely intersects the ring portion from an inner circumference thereof to an outer circumference thereof, and the inner circumference is smaller than and concentric with the outer circumference.

11. A hook which has a ring-shaped ring portion formed at one end thereof, and which has a latch portion, which is latchable onto a part coupled to a hook, formed at the other end thereof, wherein the ring portion is shaped so as to be deformed when a tensile force from an arm, which connects between the ring portion and the latch portion, is applied thereto under a state where ring portion is pivoted by a predetermined spindle, and the ring portion is shaped so as to include a slit which completely intersects the ring portion from an inner circumference thereof to an outer circumference thereof, and the inner circumference is smaller than and concentric with the outer circumference.

12. The hook according to claim 1, wherein that the slit is located at a circumferential position along the ring portion that is opposite to a circumferential position along the ring portion at which the arm extends to the latch portion.

13. The hook according to claim 1, wherein the slit is deformable to an extent that the slit width is smaller than a diameter of the spindle under a force applied from the arm.

14. The hook according to claim 10, wherein that the slit is located at a circumferential position along the ring portion that is opposite to a circumferential position along the ring portion at which the arm extends to the latch portion.

15. The hook according to claim 10, wherein the slit is deformable to an extent that the slit width is smaller than a diameter of the spindle under a force applied from the arm.

16. The hook according to claim 11, wherein that the slit is located at a circumferential position along the ring portion that is opposite to a circumferential position along the ring portion at which the arm extends to the latch portion.

17. The hook according to claim 11, wherein the slit is deformable to an extent that the slit width is smaller than a diameter of the spindle under a force applied from the arm.

* * * * *